(12) United States Patent
Weinstein et al.

(10) Patent No.: US 6,383,594 B2
(45) Date of Patent: May 7, 2002

(54) PRE-CUT FIBROUS INSULATION FOR CUSTOM FITTING BUILDING CAVITIES OF DIFFERENT WIDTHS

(75) Inventors: Larry J. Weinstein, Littleton; Robert J. Allwein, Highlands Ranch; Dean E. Eppinger, Golden, all of CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/877,569

(22) Filed: Jun. 8, 2001

Related U.S. Application Data

(60) Continuation-in-part of application No. 09/713,352, filed on Nov. 10, 2000, now abandoned, which is a continuation-in-part of application No. 09/522,976, filed on Mar. 10, 2000, now Pat. No. 6,165,305, which is a division of application No. 09/167,783, filed on Oct. 7, 1998, now Pat. No. 6,083,594.

(51) Int. Cl.[7] .............. B32B 3/14; B32B 3/00
(52) U.S. Cl. .............. 428/43; 428/74; 52/98; 52/404.1; 52/406.1
(58) Field of Search .............. 428/43, 74, 124, 428/126, 136, 167; 52/98, 404.1, 404.4, 406.1, 406.2

(56) References Cited

U.S. PATENT DOCUMENTS

| 2,335,968 A | 12/1943 | Sawtell |
|---|---|---|
| 4,756,945 A | 7/1988 | Gibb |
| 4,866,905 A | 9/1989 | Bihy |
| 5,331,787 A | 7/1994 | Paulitschke |
| 5,545,453 A | 8/1996 | Grant |
| 5,567,504 A | 10/1996 | Schakel |
| 6,083,594 A | 7/2000 | Weinstein |
| 6,128,884 A | 10/2000 | Berdan |
| 6,165,305 A | 12/2000 | Weinstein |

FOREIGN PATENT DOCUMENTS

| DE | 3203624 | 4/1983 |
|---|---|---|
| DE | 3229601 | 2/1984 |
| DE | 19700373 | 2/1998 |
| DE | 2982362 | 5/1999 |
| DE | 19914782 | 10/2000 |

OTHER PUBLICATIONS

Grunzweig German Patent DE 3118 597 May 11, 1981 Translation No.
Rufgerswerke AG German Patent GM 7830852 Jan. 25, 1979 Translation No.

*Primary Examiner*—Alexander S. Thomas
(74) *Attorney, Agent, or Firm*—Robert D. Touslee

(57) ABSTRACT

A fibrous insulation blanket is pre-cut for custom fitting the insulation blanket into wall, floor, ceiling and roof cavities of different widths formed by the framework of a building. The insulation blanket has one or more pairs of longitudinally extending cuts in the major surfaces of the blanket. Each pair of cut(s) leaves a separable connector within the blanket between adjacent sections of the insulation blanket whereby the blanket can be handled as a unit for insulating a cavity having a width about equal to the width of the blanket or easily separated or torn apart by hand at a separable connector for insulating a cavity having a lesser width. A major surface of the blanket may have a facing bonded thereto that is separable by hand along the cut(s) in the major surface to facilitate separating the blanket by hand.

62 Claims, 4 Drawing Sheets

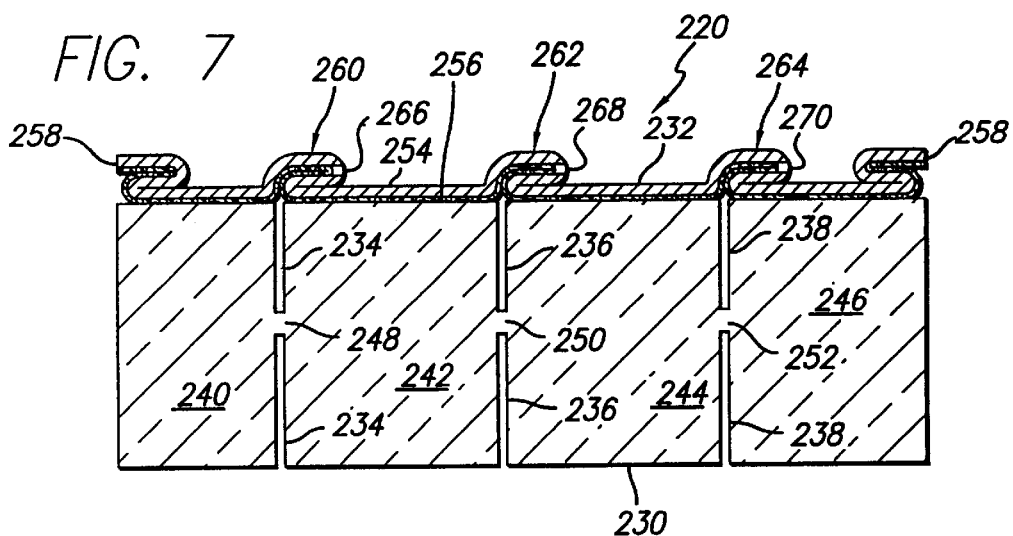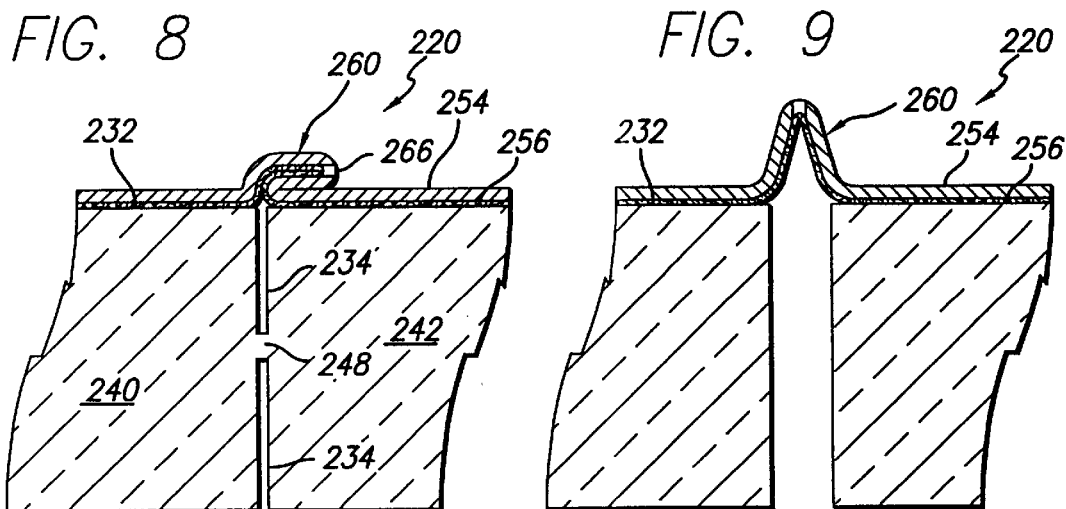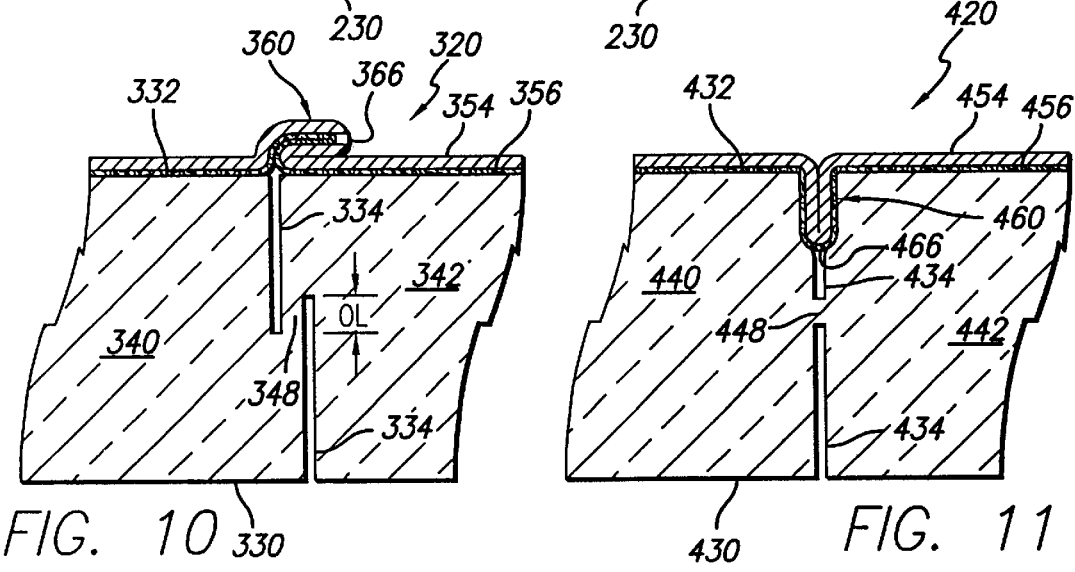

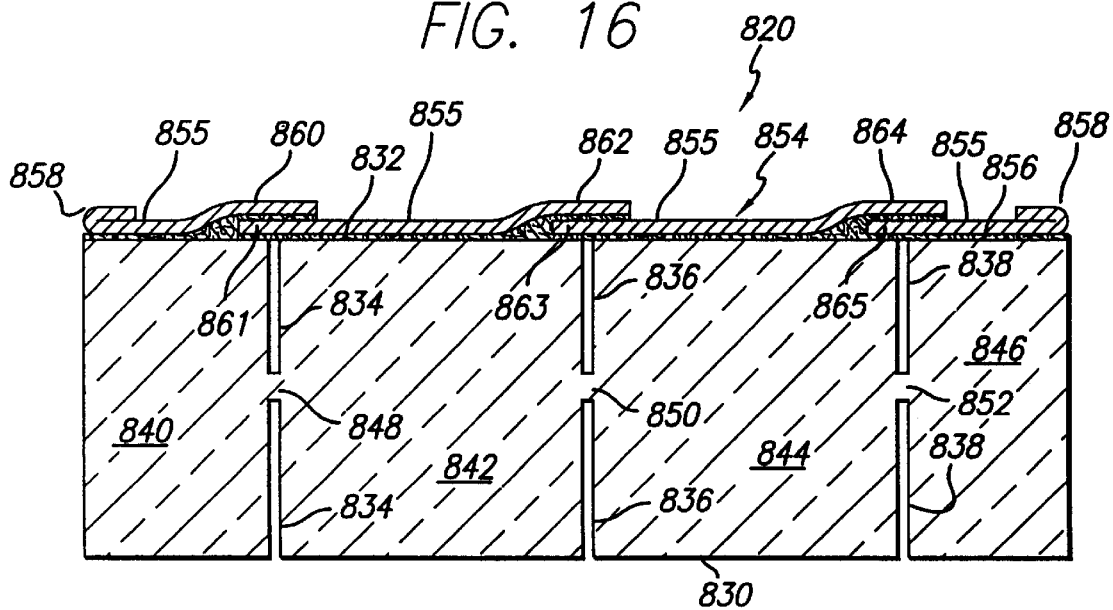
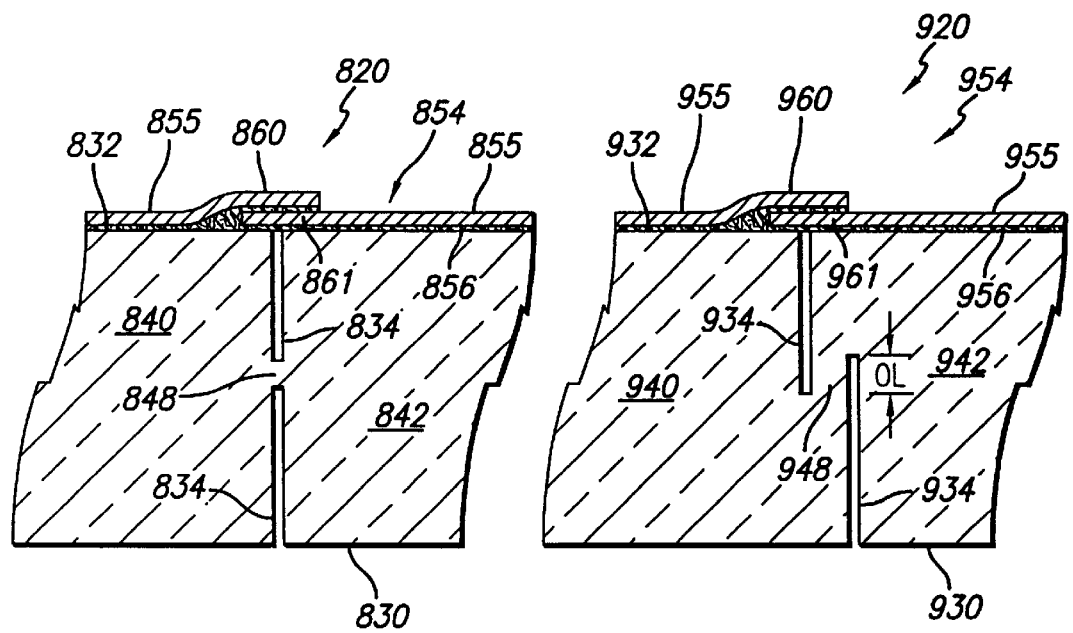

PRE-CUT FIBROUS INSULATION FOR CUSTOM FITTING BUILDING CAVITIES OF DIFFERENT WIDTHS

This application is a continuation-in-part of application Ser. No. 09/713,352, filed Nov. 10, 2000, abandoned, which is a continuation-in-part of application Ser. No. 09/522,976, filed Mar. 10, 2000, U.S. Pat. No. 6,165,305 which is a division of application Ser. No. 09/167,783, filed Oct. 7, 1998, now U.S. Pat. No. 6,083,594.

BACKGROUND OF THE INVENTION

The present invention relates to a fibrous insulation blanket pre-cut for custom fitting the fibrous insulation blanket into cavities of different widths formed by the framework of a building, such as both standard and non-standard width wall, floor, ceiling and roof cavities formed in part by successive frame members; and, in particular, to a pre-cut fibrous insulation blanket that can be handled as a unit when insulating a cavity of a certain predetermined width or easily separated or torn apart (by hand) along one or more cuts in the fibrous insulation blanket to form narrower fibrous insulation blankets when insulating a cavity having a lesser width.

Building structures, such as residential houses, industrial buildings, office buildings, mobile homes, prefabricated buildings and similar structures typically include walls (both interior and exterior), ceilings, floors and roofs which are insulated for both thermal and acoustical purposes, especially the exterior walls, the ceilings below open attic spaces, and the roofs of such structures. The walls, ceilings, floors and roofs of these structures include framing members, e.g. studs, rafters, floor and ceiling joists, beams and similar support members, which are normally spaced-apart standard distances established by the building industry. Sheathing, paneling, lathing or similar construction materials are secured to these framing members to form the walls, ceilings, floors and roofs of the structures. While the contractor seeks to maintain the spacing of the framing members in these structures at these standard distances for ease of construction and the insulation of the elongated cavities formed in these walls, ceilings, floors, and roofs, frequently, the walls, ceilings, floors and/or roofs of these structures include elongated cavities defined, at least in part, by successive or adjacent framing members which are spaced apart a nonstandard distance less than the standard spacing between framing members. Studies have shown that in a typical residential house, it is common for 50% or more of the framing members in the exterior walls of these structures to be spaced apart at nonstandard distances less than the standard spacing for such framing members.

When insulating these elongated cavities of various non-standard widths, less than a standard width, it has been the practice to take an insulation batt preformed to fit the standard cavity width and reduce the width of the insulation batt by cutting off and removing a strip of insulation material from one or both longitudinal edges of the insulation batt. U.S. Pat. No. 5,331,787; issued Jul. 26, 1994; to Kaarst; illustrates this approach. In the invention of this patent, the insulation batts or panels have widths at least equal to a predetermined maximum distance between adjacent support members defining the cavities that the batts or panels are to insulate. The batts or panels are provided with facings that are folded over along the longitudinal edges of the batts or panels so that strips of insulation material can be cut away from one or both longitudinal edges of the batts or panels to fit the batts or panels between support members spaced apart less than the predetermined maximum spacing. This method of trimming the insulation batts at the job site by cutting the batts to fit between the more closely spaced support members is time consuming, raises a significant risk or safety issue, and relies heavily on the worker's skill to accurately trim the batt or panel.

U.S. Pat. No. 4,866,905; issued Sep. 19, 1989; to Bihy et al; discloses another approach to the problem. In the invention disclosed in this patent, a continuous strip of fibrous insulation with transverse marking lines is provided. The worker cuts the strip of fibrous insulation at the job site to a width somewhat greater than the spacing between the framing members, i.e. rafters, defining the space to be insulated. Of course this method of forming insulation batts or panels at the job site is also time consuming and relies heavily on the skill of the worker cutting the insulation strip to achieve a good result.

A different approach to the problem is shown in U.S. Pat. No. 2,335,968; issued Dec. 7, 1943; to Sawtell. In the invention of this patent, the lateral edges of the insulation blanket are turned down to enable the insulation batt to be placed between framing members, i.e. rafters, spaced closer together than the width of the insulation batt. This approach does not require any cutting or trimming at the job site, but it can be used only where the spacing between the framing members is slightly less than the width of insulation blanket. In addition, the extra insulation material used to insulate cavities having less than a standard cavity width would add significantly to material costs.

Thus it can be seen that there has been a need to provide fibrous insulation blankets or batts which can be used to either insulate cavities of a predetermined width, such as but not limited to standard width framework cavities, or be quickly and easily reduced in width to fit cavities of lesser widths, such as less than standard width cavities without a need to cut the fibrous insulation blankets at the job site with knives or similar cutting tools which is both time consuming and can result in cuts or other injuries to the workers.

SUMMARY OF THE INVENTION

The pre-cut fibrous insulation blanket or batt of U.S. Pat. No. 6,083,594, issued Jul. 4, 2000, provides a solution to the above discussed problems and the pre-cut fibrous insulation blanket or batt (hereinafter "blanket") of the present invention provides another improved solution to the above discussed problems. The pre-cut fibrous insulation blanket of the present invention is pre-cut for custom fitting the insulation blanket into building cavities of different widths formed by the framework of a building. The width of the insulation blanket is typically equal to or substantially equal to the width of a standard cavity to be insulated by the insulation blanket, e.g. about fourteen and one half to about fifteen inches or about twenty two and one half to about twenty three inches for a standard wall cavity. However, the pre-cut fibrous insulation blanket may also be initially formed at a selected width, such as but not limited to about thirteen to about thirteen and one half inches, less than a standard cavity width.

Do to the compressibility and resilience of the pre-cut fibrous insulation blankets of the present invention (generally pre-cut glass fiber insulation blankets), the pre-cut fibrous insulation blankets can be fitted into cavities having a width up to about one and one half inches less than the width of the pre-cut fibrous insulation blankets without removing any sections of the blankets, e.g. a pre-cut fibrous insulation blanket having a width between about fourteen and one half to about fifteen inches can be installed within a cavity having a width of about thirteen inches or greater. For cavities of lesser widths, greater than about one and one half inches less in width than the pre-cut fibrous insulation blankets, the pre-cut fibrous insulation blankets may have one or more sections removed from the blankets so that the remaining portions of the pre-cut fibrous insulation blankets will better fit into the cavities being insulated.

The pre-cut fibrous insulation blanket of the present invention has one or more separable connectors within the blanket between and joining adjacent sections of the fibrous insulation blanket. The separable connectors are formed within the pre-cut fibrous insulation blanket by pairs of cuts in the major surfaces of the pre-cut fibrous insulation blanket. The cuts in each pair of cuts are spaced from each other a distance sufficient to form a separable connector within the pre-cut fibrous insulation blanket between adjacent sections of the pre-cut fibrous insulation blanket whereby the pre-cut fibrous insulation blanket can be handled as a unit for insulating a cavity having a predetermined width, such as but not limited to a standard cavity width, or easily separated or torn apart by hand at one or more of the separable connectors into two or more sections for insulating a cavity having a lesser width, such as a cavity having less than a standard cavity width.

Since the separable connector(s) are formed within the pre-cut fibrous insulation blanket and, preferably about midway between the major surfaces of the pre-cut fibrous insulation blanket instead of adjacent a major surface of the fibrous insulation blanket, as in U.S. Pat. No. 6,083,594, the pre-cut fibrous insulation blanket of the present invention may be easier to handle than the pre-cut fibrous insulation blankets of U.S. Pat. No. 6,083,594. The contact between the sidewalls of the cuts on either side of and forming a separable connector within the pre-cut fibrous insulation blanket of the present invention helps prevent the pre-cut fibrous insulation blanket from being flexed to much at the separable connector. With the single cut used to form the separable connector(s) in U.S. Pat. No. 6,083,594, the contact between the sidewalls of the cut help prevent the fibrous insulation blanket from flexing to much at the separable connector when the fibrous insulation blanket is flexed in one direction, but allows the fibrous insulation blanket to be more easily flexed when flexed in the other direction with the separable connector functioning as a hinge adjacent one of the major surfaces of the fibrous insulation blanket.

A major surface of the pre-cut fibrous insulation blanket may have a facing bonded thereto which, preferably, has one or more perforated lines or overlapping tabs, tabs which are adhesively bonded together, and/or tear strings for permitting the facing to be separated at the cut(s) in that major surface of the pre-cut fibrous insulation blanket to facilitate the separation or tearing apart of the faced pre-cut fibrous insulation blanket by hand, if required. Preferably, the perforations of the perforated line(s) are closed by the bonding agent (typically, asphalt or another bituminous material or a pressure sensitive adhesive) bonding the facing to the pre-cut fibrous insulation blanket so that the facing functions as a vapor barrier in spite of the perforations. Thus, the pre-cut fibrous insulation blanket with the facing can still be quickly and easily modified to fit a cavity of a particular width without sacrificing the vapor barrier properties of the facing sheet.

Preferably, the facing sheet has tabs for securing the faced pre-cut fibrous insulation blanket to framing members, e.g. with staples or an adhesive. These tabs may be located along each lateral edge of the pre-cut fibrous insulation blanket and facing sheet and pairs of tabs may be located adjacent each pair of cuts and separable connector in the pre-cut fibrous insulation blanket with perforated lines in the facing sheet or an adhesive layer separably joining the tabs of each pair of tabs.

With the pre-cut fibrous insulation blanket of the present invention, the blanket can be quickly and easily sized to fit wall or other building cavities without the need to use cutting tools at the job site to cut the insulation. Thus, the use of the pre-cut fibrous insulation blanket of the present invention to insulate the wall, floor, ceiling and roof cavities of buildings, especially wall cavities, not only reduces safety concerns, but greatly speeds up the installation process. Since insulation installers are frequently paid by the piece, the present invention enables them to operate more profitably.

BRIEF DESCRIPTION OF THE DRAWINGS

FIG. 7 is a schematic transverse cross section through a faced pre-cut fibrous insulation blanket of the present invention with integral tabs aligned or substantially aligned with each pair of cuts that form a separable connector between adjacent sections of the faced pre-cut fibrous insulation blanket and lateral tabs adjacent the lateral edges of the faced pre-cut fibrous insulation blanket.

FIG. 8 is a partial schematic transverse cross section through the faced pre-cut fibrous insulation blanket of FIG. 7 to better show the integral facing tabs adjacent one of the cuts in the fibrous insulation blanket forming a separable connector.

FIG. 9 is a partial schematic transverse cross section showing adjacent sections and integral facing tabs of the faced pre-cut fibrous insulation blanket of FIG. 8 in the process of being separated.

FIG. 10 is a partial schematic transverse cross section through a faced pre-cut fibrous insulation blanket of the present invention with the facing of FIGS. 7 to 9 and offset and overlapping cuts forming a separable connector in the faced pre-cut fibrous insulation blanket.

FIG. 11 is a partial schematic transverse cross section through a faced pre-cut fibrous insulation blanket of the present invention with integral facing tabs adjacent and tucked into one of the cuts in the fibrous insulation blanket that form a separable connector.

FIG. 16 is a schematic transverse cross section through a faced pre-cut fibrous insulation blanket of the present invention with integral tabs aligned or substantially aligned with each pair of cuts that form a separable connector between adjacent sections of the faced pre-cut fibrous insulation blanket and lateral tabs adjacent the lateral edges of the faced pre-cut fibrous insulation blanket.

FIG. 17 is a partial schematic transverse cross section through the faced pre-cut fibrous insulation blanket of FIG. 17 to better show the integral facing tabs adjacent one of the cuts in the fibrous insulation blanket forming a separable connector.

FIG. 18 is a partial schematic transverse cross section through a faced pre-cut fibrous insulation blanket of the present invention with the facing of FIGS. 16 and 17 and offset and overlapping cuts forming the separable connector in the faced pre-cut fibrous insulation blanket.

DESCRIPTION OF THE PREFERRED EMBODIMENTS

Figure 1:
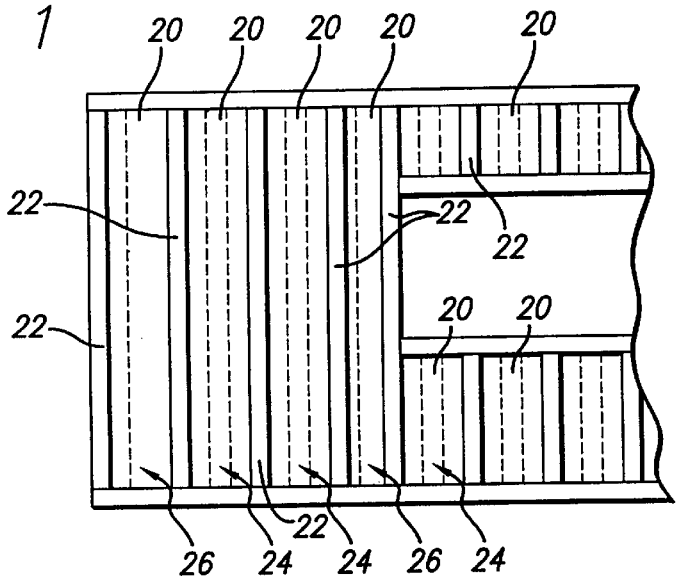
FIG. 1 is a schematic elevation of the framework in an outside wall of a building with the pre-cut fibrous insulation blanket of the present invention installed in standard width and less than standard width wall cavities.

FIG. 1 shows a portion of a typical outside wall of a residential house with the pre-cut fibrous insulation blanket 20 of the present invention installed in both standard width and non-standard width wall cavities of the outside wall. The widths of the wall cavities are defined by the framing members 22 (e.g. 2×4, 2×6, or 2×10 wall studs) which are spaced apart a standard distance (e.g. spaced apart on sixteen or twenty four inch centers) for standard cavities 24 and less than the standard distance for non-standard width cavities 26.

While the faced and unfaced pre-cut fibrous insulation blankets of the present invention may be made of other fibrous materials, preferably the faced and unfaced pre-cut fibrous insulation blankets of the present invention are made of glass fibers and typically have a density between about 0.4 pounds/ft$^3$ and about 1.5 pounds/ft$^3$. Examples of other fibers that may be used to form the unfaced and faced pre-cut fibrous insulation blankets of the present invention are mineral fibers, such as but not limited to, rock wool fibers, slag fibers, and basalt fibers, and organic fibers such as but not limited to polypropylene, polyester and other polymeric fibers. The fibers in the unfaced and faced pre-cut fibrous insulation blankets of the present invention may be bonded together for increased integrity, e.g. by a binder at their points of intersection such as but not limited to urea phenol formaldehyde or other suitable bonding materials, or the unfaced and faced pre-cut fibrous insulation blankets of the present invention may be binderless provided the blankets possess the required integrity.

Preferably, the faced and unfaced pre-cut fibrous insulation blankets of the present invention are resilient so that, after being compressed to insert the pre-cut fibrous insulation blanket or section(s) of the pre-cut fibrous insulation blanket into a cavity having a width somewhat less than the width of the pre-cut fibrous insulation blanket or the section (s) of the pre-cut fibrous insulation blanket being inserted into the cavity, the pre-cut fibrous insulation blanket or one or more sections of the pre-cut fibrous insulation blanket inserted into the cavity will expand to the width of a cavity and press against the sides of the cavity to hold or help hold the insulation blanket in place.

Typically, for most applications, such as walls in residential buildings, the resilient, unfaced or faced pre-cut fibrous insulation blankets of the present invention are delivered to the installer in the form of batts about forty six to about forty eight inches or about ninety three inches long or in the form of rolls of various lengths greater than ninety three inches in length. Typically, the widths of the faced and unfaced pre-cut fibrous insulation blankets of the present invention are substantially equal to or equal to the standard cavity width to be insulated with the pre-cut fibrous insulation blanket, e.g. about fourteen and one half to about fifteen inches wide for a cavity where the standard center to center spacing of the wall, floor, ceiling or roof framing members is sixteen inches (the cavity has a width of about fourteen and one half inches) and about twenty two and one half to about twenty three inches wide for a cavity where the standard center to center spacing of the wall, floor, ceiling or roof framing members is twenty four inches (the cavity has a width of about twenty two and one half inches). However, for certain applications, the faced or unfaced pre-cut fibrous insulation blanket may have a different initial width, such as but not limited to about thirteen to about thirteen and one half inches.

The following examples illustrate how the faced or unfaced pre-cut fibrous insulation blanket of the present invention may be formed into sections. For a faced or unfaced pre-cut fibrous insulation blanket having a width of about fifteen inches which is divided into three sections, the sections may be about three and one-half, about five, and about six and one-half inches wide (from right to left or left to right). For a faced or unfaced pre-cut fibrous insulation blanket having a width of about fifteen inches which is divided into four sections, preferably, the sections are about two and one half, about four, about four, and about four and one half inches wide (from left to right or right to left). Another example of section widths for a pre-cut fibrous insulation blanket about fifteen inches wide is about three and one-half, about four and one-half, about five and one-half, and about one and one-half inches wide (from right to left or left to right). For a faced or unfaced pre-cut fibrous insulation blanket having a width of about twenty three inches which is divided into four sections, preferably, the sections are about eleven and one half, about four, about four, and about three and one half inches wide (from left to right or right to left). For a faced or unfaced pre-cut fibrous insulation blanket having a width of about twenty three inches which is divided into six sections, preferably, the sections are about three, about four, about four, about three, about four and about five inches wide (from left to right or right to left). For a faced or unfaced pre-cut fibrous insulation blanket about thirteen inches in width which is divided into three sections, the sections may be about three, about four and one half and about five and one half inches wide.

Note that the preferred slit configurations for the fifteen inch and twenty three inch wide pre-cut fibrous insulation blankets are designed to provide blanket pieces in widths that for the most part differ in roughly two inch increments. For example with the preferred 2½ inch, 4 inch, 4 inch and 4½ inch wide section configuration of a fifteen inch wide pre-cut fibrous insulation blanket, with one tear of the unfaced or faced pre-cut fibrous insulation blanket, a blanket 2½ inches, 4½ inches, 6½ inches, 8½ inches, 10½ inches or 12½ inches in width can be formed to fit a cavity of a particular width less than a standard cavity width. For example with the preferred 3 inch, 4 inch, 4 inch, 3 inch, 4 inch, and 5 inch wide section configuration of a twenty three inch wide pre-cut fibrous insulation blanket, with one tear of the unfaced or faced pre-cut fibrous insulation blanket, a blanket 3 inches, 5 inches, 7 inches, 9 inches, 11 inches, 12 inches, 14 inches, 15 inches, 18 inches, or 20 inches in width can be formed to fit a cavity of a particular width less than a standard cavity width. Insulation installers generally custom cut insulation blankets to be about 1 inch to about 1½ inches wider than the cavity being insulated and the blanket widths formed above essentially permit cavities of all widths to be insulated with a piece of insulation blanket about ½ of an inch to about 2 inches wider than the cavity being insulated without over compressing the insulation in the direction of its width. In both the fifteen inch and twenty three inch wide pre-cut fibrous insulation blankets, the ability to form blanket pieces which generally differ in width in about two inch increments was accomplished by making the two outer most sections two inches different in width and then making the inner sections, except for one of the central sections of the twenty three inch wide blanket about four inches in width.

The thicknesses of the face or unfaced pre-cut fibrous insulation blankets of the present invention are determined by the amount of thermal resistance or sound control desired and the depth of the cavities being insulated. Typically, the pre-cut fibrous insulation blanket is about three to about ten inches or more in thickness and approximates the depth of the cavity being insulated. For example, in a wall cavity defined in part by nominally 2×4 or 2×6 inch studs or framing members, the pre-cut fibrous insulation blankets will have thicknesses of about three and one half inches and about five and one quarter inches respectively.

Figure 2:
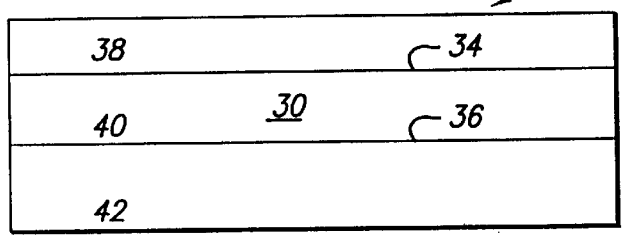
FIG. 2 is a schematic view of a major surface of an unfaced pre-cut fibrous insulation blanket of the present invention with separable connectors, formed by pairs of aligned cuts, joining adjacent sections of the fibrous insulation blanket.
Figure 3:
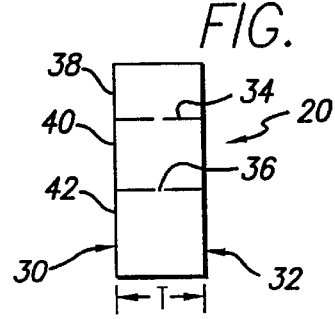
FIG. 3 is a schematic end view of the unfaced pre-cut fibrous insulation blanket of FIG. 2.

FIGS. 2 and 3 show an unfaced embodiment 20 of the pre-cut fibrous insulation blanket of the present invention. The pre-cut fibrous insulation blanket 20 has a length "L", a width "W" and a thickness "T". A first major surface 30 and a second major surface 32 of the pre-cut fibrous insulation blanket 20 are each defined by the width "W" and length "L" of the insulation blanket. There are one or more pairs of cuts, preferably two, three or more pairs of cuts (two pairs of cuts, 34 and 36, are shown) in the first and second major surfaces 30 and 32 of the pre-cut fibrous insulation blanket 20 which divide the pre-cut fibrous insulation blanket 20 into two or more sections and, preferably, three, four or more sections (three sections, 38, 40 and 42, are shown) extending the length of the pre-cut fibrous insulation blanket.

The cuts forming each pair of cuts 34 and 36 in the pre-cut fibrous insulation blanket 20: extend for the length of the pre-cut fibrous insulation blanket; extend perpendicular to or substantially perpendicular to the major surfaces 30 and 32 of the pre-cut fibrous insulation blanket; are aligned with or substantially aligned with each other; and are spaced from each other (terminate short of contacting each other) to form separable connectors 44 and 46 within the pre-cut fibrous insulation blanket 20 which join the adjacent sections 38, 40 and 42 of the pre-cut fibrous insulation blanket together. With this structure, the pre-cut fibrous insulation blanket 20 can be handled as a unit for insulating a cavity 24 having a predetermined width, such as but not limited to a thirteen inch width or a fourteen and one half or twenty two and one half inch standard cavity width, or easily separated or torn apart by hand at one or more of the separable connectors 44 and 46 formed by the pairs of cuts 34 and/or 36 (separated without the need to use of a knife or other cutting tool) for insulating a cavity 26 having a lesser width, such as less than a standard cavity width. While the separable connectors 44 and 46 can be located within but close to one of the major surfaces of the pre-cut fibrous insulation blanket 20, preferably, the separable connectors 44 and 46 are located in a midportion of the pre-cut fibrous insulation blanket and, more preferable, centered between the major surfaces 30 and 32 of the pre-cut fibrous insulation blanket. Preferably, the cuts forming each pair of cuts 34 and 36 extend from the first and second major surfaces 30 and 32 of the pre-cut fibrous insulation blanket 20 to within about one half to about one-eighth of an inch of each other and, more preferably, to within about one quarter to about three sixteenths of an inch of each other so that the separable connectors 44 and 46 can be easily separated or torn apart by hand, if desired. The heights or thicknesses of the separable connector(s) 44 and 46 can vary with the integrity of the pre-cut fibrous insulation blanket 20 with the connector(s) being greater in height or thicker for insulation blankets with less integrity. The width of the cuts forming the separable connectors, such as the cuts 34 and 36 in the pre-cut fibrous insulation blanket 20, in faced or unfaced embodiments of the pre-cut fibrous insulation blanket of the present invention is typically less than one hundredth of an inch and the resilience of the pre-cut fibrous insulation blankets of the present invention causes the cuts in the pre-cut fibrous insulation blankets of the present invention to close after the cuts are made in the blanket.

FIGS. 4 to 18 show nine different embodiments 120 to 920 of the faced pre-cut fibrous insulation blanket of the present invention. Preferably, the facings or facing sheets of the faced pre-cut fibrous insulation blankets 120 to 920 are made of kraft paper, a foil-scrim-kraft paper laminate, or a polymeric film, such as but not limited to polyethylene, and are bonded to a major surface of the pre-cut fibrous insulation blanket by a bonding agent. Preferably, the bonding agent for kraft paper or foil-scrim-kraft paper facings is an asphalt or other bituminous material that can be coated onto or otherwise applied to one side of the facing sheet just prior to applying the facing sheet to the pre-cut fibrous insulation blanket and the bonding agent for the polymeric film facing is a commercially available pressure sensitive adhesive that can be coated onto or otherwise applied to one side of the facing sheet just prior to applying the facing sheet to the pre-cut fibrous insulation blanket.

Figure 4:
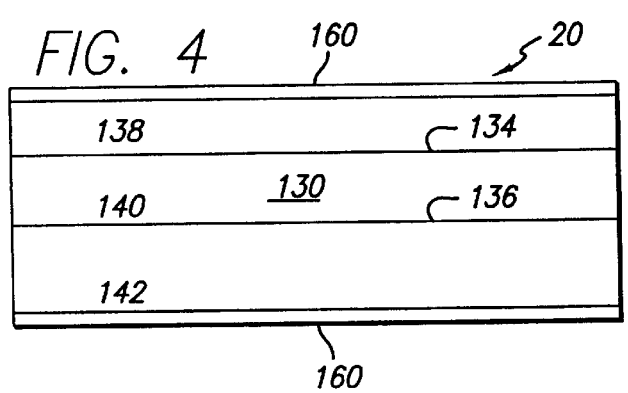
FIG. 4 is a schematic view of a first major surface of a faced pre-cut fibrous insulation blanket of the present invention with separable connectors, formed by pairs of aligned cuts, joining adjacent sections of the fibrous insulation blanket.
Figure 5:
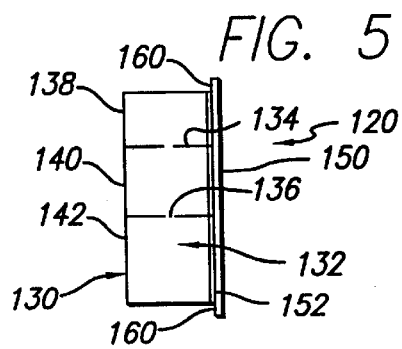
FIG. 5 is a schematic end view of the faced pre-cut fibrous insulation blanket of FIG. 4.
Figure 6:
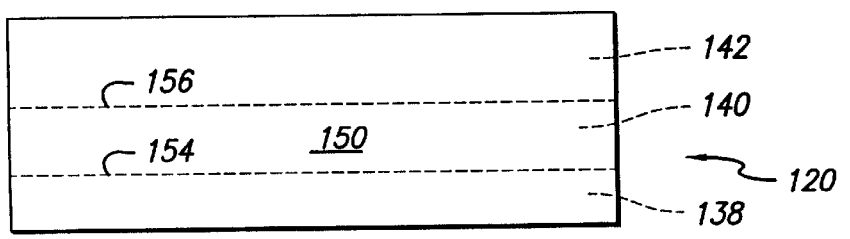
FIG. 6 is a schematic view of a faced, second major surface of the faced, pre-cut fibrous insulation blanket of FIG. 4.

FIGS. 4–6 show a faced embodiment 120 of the pre-cut fibrous insulation blanket. As shown, the pre-cut fibrous insulation blanket 120 of FIGS. 4–6 has a first major surface 130 and a second major surface 132. There are one or more pairs of cuts, preferably two, three or more pairs of cuts (two pairs of cuts, 134 and 136, are shown) in the first and second major surfaces 130 and 132 of the pre-cut fibrous insulation blanket which divide the pre-cut fibrous insulation blanket 120 into two or more sections, preferably three, four or more sections (three sections, 138,140 and 142, are shown) extending the length of the pre-cut fibrous insulation blanket. The faced pre-cut fibrous insulation blanket 120 is the same as the unfaced embodiment 20 with the following exceptions: the faced embodiment 120 of the pre-cut fibrous insulation blanket includes a facing 150 with lateral tabs 160 for securing the faced pre-cut fibrous insulation blanket to framing members by stapling or other conventional means and a bonding agent 152 which bonds the facing 150 to the second major surface 132 of the faced pre-cut fibrous insulation blanket.

The cuts forming each pair of cuts 134 and 136 in the faced pre-cut fibrous insulation blanket 120: extend for the length of the faced pre-cut fibrous insulation blanket 120; extend perpendicular to or substantially perpendicular to the major surfaces 130 and 132 of the faced pre-cut fibrous insulation blanket; are aligned with or substantially aligned with each other; and are spaced from each other (terminate short of contacting each other) to form separable connectors 144 and 146 within the faced pre-cut fibrous insulation blanket which join the adjacent sections 138, 140 and 142 of the faced pre-cut fibrous insulation blanket together as a unit for handling.

While the separable connectors 144 and 146 can be located within but close to one of the major surface of the faced pre-cut fibrous insulation blanket 120, preferably, the separable connectors 144 and 146 are located in a midportion of the faced pre-cut fibrous insulation blanket and, more preferable, centered between the major surfaces 130 and 132 of the faced pre-cut fibrous insulation blanket. Preferably, the cuts forming each pair of cuts 134 and 136 in the faced pre-cut fibrous insulation blanket extend from the first and second major surfaces 130 and 132 of the faced pre-cut fibrous insulation blanket 120 to within about one half to about one eighth of an inch of each other and, more preferably, to within about one quarter to about three sixteenths of an inch of each other so that the separable connectors can be easily separated or torn apart by hand, if desired. The heights or thicknesses of the separable connector(s) 144 and 146 can vary with the integrity of the faced pre-cut fibrous insulation blanket 120 with the connector(s) being greater in height or thicker for insulation blankets with less integrity.

The facing or facing sheet 150 typically overlies the entire second major surface 132 of the pre-cut fibrous insulation blanket 120 and is bonded to the second major surface of the pre-cut fibrous insulation blanket by the bonding agent 152. As shown, the facing sheet 150 has first and second perforated lines 154 and 156 therein extending for the length of the faced pre-cut fibrous insulation blanket. The perforated lines 154 and 156 are aligned or substantially aligned longitudinally with the pairs of cuts 134 and 136 in the first and second major surfaces of the faced pre-cut fibrous insulation blanket 120. With this structure, the faced pre-cut fibrous insulation blanket 120, with the facing 150, can be handled as a unit for insulating a cavity having a predetermined with, such as but not limited to a thirteen inch width or a fourteen and one half or a twenty two and one half standard cavity width, or easily separated by hand into sections 138, 140 and/or 142 by separating or tearing apart the blanket at the first or second separable connector 144 or 146 and the facing sheet at the first or second perforated line 154 or 156 (separated without the need to use of a knife or other cutting tool) for insulating a cavity having a lesser width, such as less than a standard cavity width.

The spaced apart perforations of the perforated lines 154 and 156 may be of various shapes, including but not limited to, round, oval, elongated, slit shaped, etc. and the spacing between the perforations and the length of the perforations may vary as long as the facing is easily separated by hand along the line formed by the perforations. Preferably, the perforations of the first and second perforated lines 154 and 156 in the embodiment shown, are filled, e.g. with the bonding agent 152 that bonds the facing sheet 150 to the second major surface 132 of the pre-cut fibrous insulation blanket 120 or a similar material, to close the perforations so that the facing sheet 150 functions as a vapor barrier. While perforations are preferred, tear strings could be used with or substituted for the perforated lines 154 and 156. The tear strings would have a free end for gripping; be bonded to the facing by the bonding agent 152; and would extend along lines that coincide with the locations of the perforated lines 154 and 156.

FIGS. 7, 8 and 9 show a second embodiment 220 of the faced pre-cut fibrous insulation blanket of the present invention. As shown, the faced pre-cut fibrous insulation blanket 220 has a first major surface 230 and a second major surface 232. There are one or more pairs of cuts, preferably two, three or more pairs of cuts (cuts 234, 236 and 238 are shown) in the first and second major surfaces 230 and 232 of the pre-cut fibrous insulation blanket which divide the pre-cut fibrous insulation blanket 220 into two or more sections, preferably three, four or more sections (four sections 240, 242, 244 and 246 are shown) extending the length of the pre-cut fibrous insulation blanket.

The cuts forming each pair of cuts 234, 236 and 238 in the faced pre-cut fibrous insulation blanket 220: extend for the length of the pre-cut fibrous insulation blanket; extend perpendicular to or substantially perpendicular to the major surfaces 230 and 232 of the faced pre-cut fibrous insulation blanket; are aligned with or substantially aligned with each other; and are spaced from each other (terminate short of contacting each other) to form separable connectors 248, 250 and 252 within the pre-cut fibrous insulation blanket 220 which join the adjacent sections 240, 242, 244 and 246 of the faced pre-cut fibrous insulation blanket together for handling, but which can be easily separated or torn apart by hand. While the separable connectors 248, 250 and 252 can be located within but close to one of the major surfaces of the faced pre-cut fibrous insulation blanket 220, preferably, the separable connectors 248, 250 and 252 are located in a midportion of the faced pre-cut fibrous insulation blanket and, more preferable, centered between the major surfaces 230 and 232 of the faced pre-cut fibrous insulation blanket. Preferably, the cuts of each pair of cuts 234, 236 and 238 extend from the first and second major surfaces 230 and 232 of the faced pre-cut fibrous insulation blanket 220 to within about one half to about one-eighth of an inch of each other and, more preferably, to within about one quarter to about three sixteenths of an inch of each other to form separable connectors which can be easily separated or torn apart by hand. The heights or thicknesses of the separable connector(s) 248, 250 and 252 can vary with the integrity of the pre-cut fibrous insulation blanket 220 with the connector(s) being greater in height or thicker for insulation blankets with less integrity.

The facing or facing sheet 254 typically overlies the entire second major surface 232 of the pre-cut fibrous insulation blanket 220 and is bonded to the second major surface of the pre-cut fibrous insulation blanket 220 by a bonding agent 256. As shown in FIG. 7, the facing sheet 254 has lateral tabs 258 and pairs of tabs 260, 262 and 264 aligned or substantially aligned with the pairs of cuts 234, 236 and 238 and the separable connectors 248, 250 and 252 in the faced pre-cut fibrous insulation blanket 220 for stapling or otherwise securing the faced pre-cut fibrous insulation blanket or section(s) of the faced pre-cut fibrous insulation blanket to frame members. The lateral tabs 258, which may be formed by Z-shaped pleats in the facing 254 as shown in FIG. 7, extend for the length of the faced pre-cut fibrous insulation blanket 220. The pairs of tabs 260, 262 and 264 also extend for the lengths of the cuts 234, 236 and 238 and the separable connectors 248, 250 and 252 of the faced pre-cut fibrous insulation blanket 220. Each pair of tabs 260, 262 and 264 is formed by double folding the facing sheet back upon itself to form a Z-shaped pleat in the facing sheet 254 with the tabs of each pair of tabs 260, 262 and 264 being separably connected to each other by perforated lines 266, 268 and 270 at a fold of the Z-shaped pleat so that the facing sheet 254 can be separated at each of the pairs of cuts and separable connectors. With this structure, the faced pre-cut fibrous insulation blanket 220 with the facing 254, can be handled as a unit for insulating a cavity having a predetermined width, such as but not limited to a thirteen inch width or a standard cavity width of fourteen and one half or twenty two and one half inches, or easily separated or torn apart by hand into blanket sections 240, 242, 244 and/or 246 by separating or tearing apart the faced pre-cut fibrous insulation blanket 220 at the pair of cuts 234 and the separable connector 248 in the blanket and the perforated line 266 of the facing sheet 254, the pair of cuts 236 and the separable connector 250 in the blanket and the perforated line 268 of the facing sheet 254, or the pair of cuts 238 and separable connector 252 in the blanket and the perforated line 270 of the facing sheet 254 (separated without the need to use of a knife or other cutting tool) for insulating a cavity having a lesser width, e.g. less than a standard cavity width.

The spaced apart perforations of the perforated lines 266, 268 and 270 may be of various shapes, including but not limited to, round, oval, elongated, slit shaped, etc. and the spacing between perforations and the length of the perforations may vary as long as the facing is easily separated by hand along the line formed by the perforations. Preferably, the perforations of perforated lines 266, 268 and 270, are filled, e.g. with the bonding agent 256 that bonds the facing sheet 254 to the second major surface 232 of the pre-cut fibrous insulation blanket or a similar material, to close the perforations so that the facing sheet 254 functions as a vapor barrier. While perforations are preferred, tear strings could be used with or substituted for the perforated lines 266, 268 and 270. The tear strings would have a free end for gripping; be bonded to the facing by the bonding agent 256; and would extend along lines that coincide with the locations of the perforated lines 266, 268 and 270.

The use of pairs of tabs 260, 262 and 264 formed by Z-shaped pleats in the facing 254 wherein the tabs of each pair of tabs are separably bonded together by the bonding agent 256 bonding the facing 254 to the second major surface of the faced pre-cut fibrous insulation blanket 220 provides several advantages: the overlapping and bonding together of the tabs across their widths in each pair of tabs with the perforations at the juncture of the tabs improves the vapor barrier properties of the perforated facing; there is less tendency for the facing 254 to split during installation because the bonding agent 256 joining the tabs of each pair of tabs together can yield when the faced pre-cut fibrous insulation blanket is flexed; the folds at the perforations in the Z-shaped pleats facilitate the tearing of the facing 254 at the perforations and help prevent the tears from propagating out of the tabs; and, as shown in FIG. 9, as the blanket sections adjacent a pair of tabs are separated, the tabs which initially lie on a major surface of the blanket are pulled away from the major surface of the blanket to extend generally perpendicular to the major surface of the blanket for better grasping by a worker as the tabs peel away from each other and finally separate from each other along the perforated lines. In addition, the use of facing tabs adjacent each pair of cuts and separable connectors between blanket sections, in this and other faced embodiments of the invention, not only provides tabs for securing the blanket sections in place, but also enables the facings to provide vapor barriers across the entire widths of blanket sections even when the means of separating the facings along each pair of cuts and separable connectors, e.g. perforated lines, are not properly aligned with each pair of cuts and separable connectors.

The integral pairs of tabs 260, 262 and 264 aligned with or substantially aligned with the cuts 234, 236 and 238 and separable connectors 248, 250 and 252 of the faced pre-cut fibrous insulation blanket 220 plus lateral tabs, such as the lateral tabs 258 shown in FIG. 7, can be used to secure the sections 240, 242, 244 and 246 of the faced pre-cut fibrous insulation blanket 220 to framing members, by stapling or other conventional means, either as a unit or as one or more sections when one or more sections 240, 242, 244 and 246 are separated from the remainder of the faced pre-cut fibrous insulation blanket. Preferably, the tabs are about one half to about one and one half inches in width. When securing the faced pre-cut fibrous insulation blanket 220 or one or more sections 240, 242, 244 and 246 of the pre-cut fibrous insulation blanket to framing members, the pairs tabs 260, 262 and 264 and lateral tabs 258 used to secure the blanket are at least partially unfolded and extended outward from the faced pre-cut fibrous insulation blanket 220 or sections 240, 242, 244 and/or 246 of the faced pre-cut fibrous insulation blanket prior to stapling or otherwise securing the tabs to the framing members.

FIG. 10 is a partial transverse cross section of a third embodiment 320 of the faced pre-cut fibrous insulation blanket of the present invention showing the pair of cuts 334 in the first and second major surfaces 330 and 332 of the faced pre-cut fibrous insulation blanket forming the separable connector 348 between sections 340 and 342 of the faced pre-cut fibrous insulation blanket. With one exception, the faced pre-cut fibrous insulation blanket 320 is the same as the faced pre-cut fibrous insulation blanket 220. Unlike the faced pre-cut fibrous insulation blanket 220 wherein the cuts of each pair of cuts forming the separable connectors are aligned or substantially aligned with each other, the cuts of the pairs of cuts forming the separable connectors of the faced pre-cut fibrous insulation blanket 320 are laterally offset with respect to each other and, preferably, overlap to form the separable connectors. As shown in FIG. 10, the cuts of the pair of cuts 334 are laterally offset with respect to each other and overlap a distance "OL" to form the separable connector 348.

Having the cuts forming the pairs of cuts in the faced pre-cut fibrous insulation blanket offset and overlapping with respect to each other, may make the embodiment of FIG. 10 easier to produce. By offsetting and overlapping the cuts forming the separable connectors, the tolerances for the distance to be maintained between the cuts to form the separable connectors may be easier to maintain. The offsetting and overlapping of the cuts forming the separable connectors of the faced pre-cut fibrous insulation blanket 320 may also facilitate the separation of the faced pre-cut fibrous insulation blanket at the separable connectors. The fibers of the fibrous blankets typically used in the invention, i.e. glass fiber blankets, are typically randomly oriented with respect to each other but, due to the manner in which the fibers are collected to form a blanket, the fibers tend to lie predominately in layers or planes generally parallel to the major surfaces of the blanket. Thus, the blankets tend to separate more easily along these layers.

The facing sheet 354 is bonded to the second major surface 332 of the faced pre-cut fibrous insulation blanket by a bonding agent 356, such as asphalt or another bituminous material or a pressure sensitive adhesive. As shown in FIG. 10, the facing 354 is provided with a pair of integral, tabs 360 aligned or substantially aligned with the pair of cuts 234 and the separable connector 348 and extending for the length of the cuts 234 and the separable connector 348. The pair of tabs 360 is formed by double folding the facing sheet 354 back upon itself to form a Z-shaped pleat in the facing sheet 354 with the tabs of the pair of tabs 360 being separably connected to each other by a perforated lines 366 so that the facing can be separated at the pair of cuts 234 and separable connector 348. An identical pair of integral tabs is aligned with or substantially aligned with and extends for the length of each of the other pairs of cuts and separable connectors of the faced pre-cut fibrous insulation blanket 320 joining other sections of the faced pre-cut fibrous insulation blanket 320. With this structure, the faced pre-cut fibrous insulation blanket 320 with the facing 354, can be handled as a unit for insulating a cavity having a predetermined width, such as but not limited to a thirteen inch width or a standard cavity width of fourteen and one half or twenty two and one half inches, or easily separated or torn apart by hand into one or more blanket sections by separating or tearing apart the faced pre-cut fibrous insulation blanket 320 at a pair of cuts and separable connector in the blanket and at a perforated line of the facing sheet 354 joining adjacent tabs (separated without the need to use of a knife or other cutting tool) for insulating a cavity having a lesser width, e.g. less than a standard cavity width. Preferably, the perforations of the perforated lines separably joining the tabs are filled, e.g. with the bonding agent 356 or a similar material so that the facing 354 functions as a vapor barrier and, as discussed above, while perforations are preferred, tear strings could be used with or substituted for the perforated lines to effect tab separation.

The pairs of tabs aligned with or substantially aligned with the pairs of cuts and the separable connectors plus lateral tabs, such as the lateral tabs of the pre-cut fibrous insulation blanket 220 shown in FIG. 7, can be used to secure the sections of the faced pre-cut fibrous insulation blanket 320 to framing members by stapling or other conventional means either as a unit or as one or more sections when one or more sections are separated from the remainder of the pre-cut fibrous insulation blanket. As with the embodiment of FIGS. 7 to 9, when securing the faced pre-cut fibrous insulation blanket 320 or one or more sections of the faced pre-cut fibrous insulation blanket 320 to framing members, the tabs adjacent the separable connectors and the lateral tabs used to secure the blanket are at least partially unfolded and extended outward from the pre-cut fibrous insulation blanket 320 and/or sections of the pre-cut fibrous insulation blanket prior to stapling or otherwise securing the tabs to the framing members. Where a facing is not desired, an unfaced pre-cut fibrous insulation blanket can be used with offset and, preferably, overlapping pairs of cuts forming the separable connectors. Except for the lack of a facing, such a pre-cut fibrous insulation blanket would be the same as the faced pre-cut fibrous insulation blanket 320.

FIG. 11 is a partial transverse cross section of a fourth embodiment 420 of the faced pre-cut fibrous insulation blanket of the present invention showing a pair of cuts 434 in the first and second major surfaces 430 and 432 of the faced pre-cut fibrous insulation blanket forming a separable connector 448 between sections 440 and 442 of the faced pre-cut fibrous insulation blanket. The facing sheet 454 is bonded to the second major surface 432 of the faced pre-cut fibrous insulation blanket by the bonding agent 456 which preferably is an asphalt or other bituminous material or a pressure sensitive adhesive.

Except for the use of pairs of tabs inserted into the cuts in the second major surface of the faced pre-cut fibrous insulation blanket 420, the faced pre-cut fibrous insulation blanket 420 is the same as the faced pre-cut fibrous insulation blanket 220 of FIGS. 7 to 9. As shown in FIG. 11, the facing sheet 454 is provided with a pair of tabs 460 adjacent and extending for the length of the cut 434 in the second major surface 432 of the faced pre-cut fibrous insulation blanket 420. The tabs of the pair of tabs 460 are joined together along a perforated line 466 so that the tabs can be separated from each other at the connector 448 when the sections 440 and 442 are separated from each other and, as shown in FIG. 11, the pair of tabs 460 is tucked down into the cut 434. An identical pair of tabs are provided adjacent any additional cuts in the second major surface 432 of the faced pre-cut fibrous insulation blanket forming additional separable connectors joining other sections of the faced pre-cut fibrous insulation blanket 420. With this structure, the faced pre-cut fibrous insulation blanket 420 with the facing 454, can be handled as a unit for insulating a cavity having a predetermined width, such as but not limited to a thirteen inch width or a standard cavity width of fourteen and one half or twenty two and one half inches, or easily separated or torn apart by hand into one or more blanket sections by separating or tearing apart the faced pre-cut fibrous insulation blanket 420 at a pair of cuts and separable connector in the blanket and at a perforated line of the facing sheet 454 joining the adjacent tabs (separated without the need to use of a knife or other cutting tool) for insulating a cavity having a lesser width, e.g. less than a standard cavity width.

The tabs inserted into the cuts in the second major surface of the faced pre-cut fibrous insulation blanket plus lateral tabs, such as the tabs 258 of the faced pre-cut fibrous insulation blanket shown in FIG. 7, can be used to secure the sections of the faced pre-cut fibrous insulation blanket 420 to framing members by stapling or other conventional means either as a unit or as one or more sections when one or more sections are separated from the remainder of the faced pre-cut fibrous insulation blanket. As with the faced pre-cut fibrous insulation blanket 220, when securing the faced pre-cut fibrous insulation blanket 420 or one or more sections of the faced pre-cut fibrous insulation blanket 420 to framing members, the tabs adjacent the cuts in the second major surface forming the connectors and the lateral tabs used to secure the blanket are at least partially unfolded and extended outward from the faced pre-cut fibrous insulation blanket 420 and/or sections of the faced pre-cut fibrous insulation blanket prior to stapling or otherwise securing the tabs to the framing members.

Figure 12:
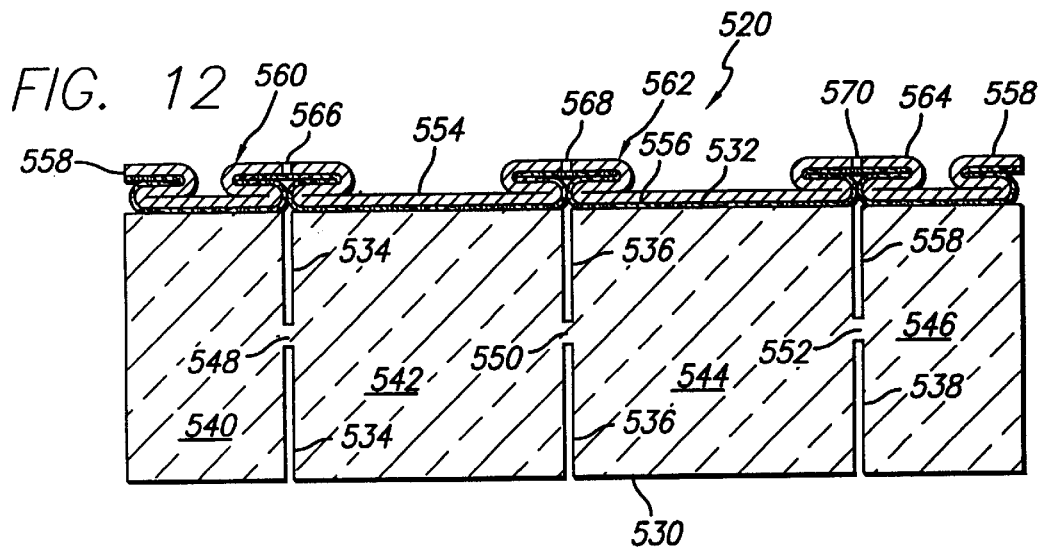
FIG. 12 is a schematic transverse cross section through a faced pre-cut fibrous insulation blanket of the present invention with integral tabs aligned or substantially aligned with each pair of cuts that form a separable connector between adjacent sections of the faced pre-cut fibrous insulation blanket and lateral tabs adjacent the lateral edges of the faced pre-cut fibrous insulation blanket.
Figure 13:
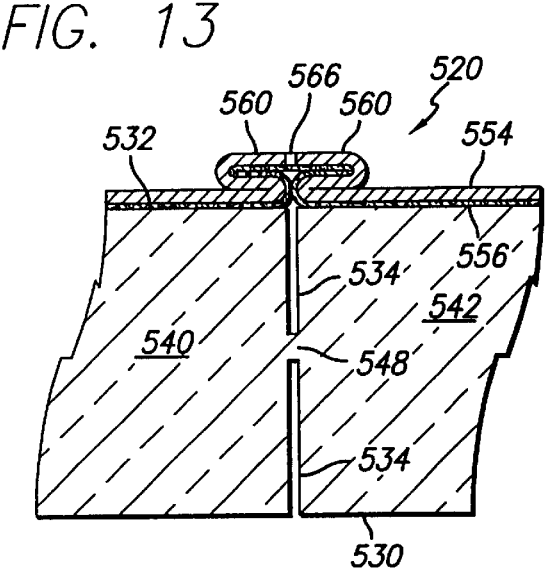
FIG. 13 is a partial schematic transverse cross section through the faced pre-cut fibrous insulation blanket of FIG. 12 to better show the integral facing tabs adjacent one of the cuts in the fibrous insulation blanket forming a separable connector.

FIGS. 12 and 13 show a fifth embodiment 520 of the faced pre-cut fibrous insulation blanket of the present invention. As shown, the faced pre-cut fibrous insulation blanket 520 has a first major surface 530 and a second major surface 532. There are one or more pairs of cuts, preferably two, three or more pairs of cuts (cuts 534, 536 and 538 are shown) in the first and second major surfaces 530 and 532 of the pre-cut fibrous insulation blanket which divide the pre-cut fibrous insulation blanket 520 into two or more sections, preferably three, four or more sections (four sections 540, 542, 544 and 546 are shown) extending the length of the pre-cut fibrous insulation blanket.

The cuts forming each pair of cuts 534, 536 and 538 in the faced pre-cut fibrous insulation blanket 520: extend for the length of the pre-cut fibrous insulation blanket; extend perpendicular to or substantially perpendicular to the major surfaces 530 and 532 of the faced pre-cut fibrous insulation blanket; are aligned with or substantially aligned with each other; and are spaced from each other (terminate short of contacting each other) to form separable connectors 548, 550 and 552 within the pre-cut fibrous insulation blanket 520 which join the adjacent sections 540, 542, 544 and 546 of the faced pre-cut fibrous insulation blanket together for handling, but which can be easily separated or torn apart by hand. While the separable connectors 548, 550 and 552 can be located within but close to one of the major surfaces of the faced pre-cut fibrous insulation blanket 520, preferably, the separable connectors 548, 550 and 552 are located in a midportion of the faced pre-cut fibrous insulation blanket and, more preferable, centered between the major surfaces 530 and 532 of the faced pre-cut fibrous insulation blanket. Preferably, the cuts of each pair of cuts 534, 536 and 538 extend from the first and second major surfaces 530 and 532 of the faced pre-cut fibrous insulation blanket 520 to within about one half to about one-eighth of an inch of each other and, more preferably, to within about one quarter to about three sixteenths of an inch of each other to form separable connectors which can be easily separated or torn apart by hand. The heights or thicknesses of the separable connector (s) 548, 550 and 552 can vary with the integrity of the pre-cut fibrous insulation blanket 520 with the connector(s) being greater in height or thicker for insulation blankets with less integrity.

The facing or facing sheet 554 typically overlies the entire second major surface 532 of the pre-cut fibrous insulation blanket 520 and is bonded to the second major surface of the pre-cut fibrous insulation blanket 520 by a bonding agent 556. As shown in FIG. 12, the facing sheet 554 has lateral tabs 558 and pairs of tabs 560, 562 and 564 aligned or substantially aligned with the pairs of cuts 534, 536 and 538 and the separable connectors 548, 550 and 552 in the faced pre-cut fibrous insulation blanket 520 for stapling or otherwise securing the faced pre-cut fibrous insulation blanket or section(s) of the faced pre-cut fibrous insulation blanket to frame members. The lateral tabs 558, which may be formed by Z-shaped pleats in the facing 554 as shown in FIG. 12, extend for the length of the faced pre-cut fibrous insulation blanket 520. The pairs of tabs 560, 562 and 564 also extend for the length of the faced pre-cut fibrous insulation blanket 520. Each tab of the pairs of tabs 560, 562 and 564 is formed by double folding the facing sheet back upon itself to form a Z-shaped pleat in the facing sheet 554 with the tabs of each pair of tabs 560, 562 and 564 being separably connected to each other by perforated lines 566, 568 and 570 that extend for the length of the tabs. The perforated lines, separably joining the tabs of each pair of tabs 560, 562 and 564 are aligned or substantially aligned longitudinally with the pairs of cuts 534, 536 and 538 and the separable connectors 548, 550 and 552, respectively, so that the facing sheet can be separated at each pair of cuts and separable connector in the blanket. With this structure, the faced pre-cut fibrous insulation blanket 520 with the facing 554, can be handled as a unit for insulating a cavity having a predetermined width, such as but not limited to a thirteen inch width or a standard cavity width of fourteen and one half or twenty two and one half inches, or easily separated or torn apart by hand into blanket sections 540, 542, 544 and/or 546 by separating or tearing apart the faced pre-cut fibrous insulation blanket 520 at the pair of cuts 534 and the separable connector 548 in the blanket and the perforated line 566 of the facing sheet 554, the pair of cuts 536 and the separable connector 550 in the blanket and the perforated line 568 of the facing sheet 554, or the pair of cuts 538 and separable connector 552 in the blanket and the perforated line 570 of the facing sheet 554 (separated without the need to use of a knife or other cutting tool) for insulating a cavity having a lesser width, e.g. less than a standard cavity width.

The spaced apart perforations of the perforated lines 566, 568 and 570 may be of various shapes, including but not limited to, round, oval, elongated, slit shaped, etc. and the spacing between perforations and the length of the perforations may vary as long as the facing is easily separated by hand along the line formed by the perforations. Preferably, the perforations of perforated lines 566, 568 and 570, are filled, e.g. with the bonding agent 556 that bonds the facing sheet 554 to the second major surface 532 of the pre-cut fibrous insulation blanket or a similar material, to close the perforations so that the facing sheet 554 functions as a vapor barrier. While perforations are preferred, tear strings could be used with or substituted for the perforated lines 566, 568 and 570. The tear strings would have a free end for gripping; be bonded to the facing by the bonding agent 556; and would extend along lines that coincide with the locations of the perforated lines 566, 568 and 570.

The integral pairs of tabs 560, 562 and 564 aligned with or substantially aligned with the cuts 534, 536 and 538 and separable connectors 548, 550 and 552 of the faced pre-cut fibrous insulation blanket 520 plus lateral tabs, such as the lateral tabs 558 shown in FIG. 12, can be used to secure the sections 540, 542, 544 and 546 of the faced pre-cut fibrous insulation blanket 520 to framing members, by stapling or other conventional means, either as a unit or as one or more sections when one or more sections 540, 542, 544 and 546 are separated from the remainder of the faced pre-cut fibrous insulation blanket. Preferably, the tabs are about one half to about one and one half inches in width. When securing the faced pre-cut fibrous insulation blanket 520 or one or more sections 540, 542, 544 and 546 of the pre-cut fibrous insulation blanket to framing members, the pairs tabs 560, 562 and 564 and lateral tabs 558 used to secure the blanket are at least partially unfolded and extended outward from the faced pre-cut fibrous insulation blanket 520 or sections 540, 542, 544 and/or 546 of the faced pre-cut fibrous insulation blanket prior to stapling or otherwise securing the tabs to the framing members.

Figure 14:
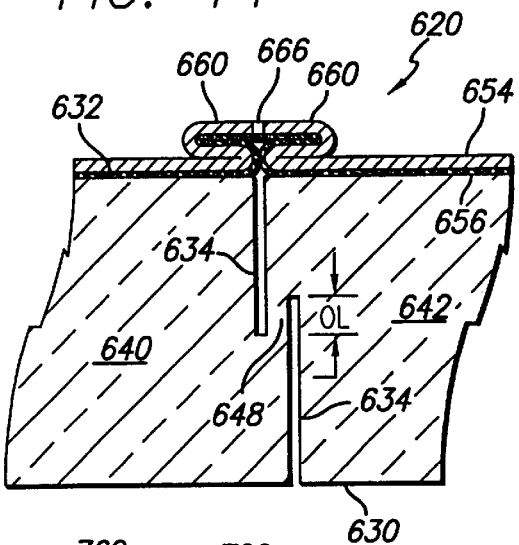
FIG. 14 is a partial schematic transverse cross section through a faced pre-cut fibrous insulation blanket of the present invention with the facing of FIGS. 12 and 13 and offset and overlapping cuts forming a separable connector in the faced pre-cut fibrous insulation blanket.

FIG. 14 is a partial transverse cross section of a sixth embodiment 620 of the faced pre-cut fibrous insulation blanket of the present invention showing the pair of cuts 634 in the first and second major surfaces 630 and 632 of the faced pre-cut fibrous insulation blanket forming the separable connector 648 between sections 640 and 642 of the faced pre-cut fibrous insulation blanket. With one exception, the faced pre-cut fibrous insulation blanket 620 is the same as the faced pre-cut fibrous insulation blanket 520. Unlike the faced pre-cut fibrous insulation blanket 520 wherein the cuts of each pair of cuts forming the separable connectors are aligned or substantially aligned with each other, the cuts of the pairs of cuts forming the separable connectors of the faced pre-cut fibrous insulation blanket 620 are laterally offset with respect to each other and overlap to form the separable connectors. As shown in FIG. 14, the cuts of the pair of cuts 634 are laterally offset with respect to each other and, preferably, overlap a distance "OL" to form the separable connector 648.

The facing sheet 654 is bonded to the second major surface 632 of the faced pre-cut fibrous insulation blanket by a bonding agent 656, such as asphalt or another bituminous material or a pressure sensitive adhesive. As shown in FIG. 14, the facing 654 is provided with a pair of integral, tabs 660 aligned or substantially aligned with the pair of cuts 634 and the separable connector 648 and extending for the length of the pre-cut fibrous insulation blanket 620. The each tab of the pair of tabs 660 is formed by double folding the facing sheet 654 back upon itself to form a Z-shaped pleat in the facing sheet 654 with the tabs of the pair of tabs 660 being separably connected to each other by a perforated lines 666. The perforated line 666, separably joining the tabs 660 is aligned or substantially aligned longitudinally with the pairs of cuts 634 and the separable connector 648 so that the facing can be separated at the pair of cuts 634 and separable connector 648. An identical pair of integral tabs is aligned with or substantially aligned with and extends for the length of each of the other pairs of cuts and separable connectors of the faced pre-cut fibrous insulation blanket 620 joining other sections of the faced pre-cut fibrous insulation blanket 620. With this structure, the faced pre-cut fibrous insulation blanket 620 with the facing 654, can be handled as a unit for insulating a cavity having a predetermined width, such as but not limited to a thirteen inch width or a standard cavity width of fourteen and one half or twenty two and one half inches, or easily separated or torn apart by hand into one or more blanket sections by separating or tearing apart the faced pre-cut fibrous insulation blanket 620 at a pair of cuts and separable connector in the blanket and at a perforated line of the facing sheet 654 joining adjacent tabs (separated without the need to use of a knife or other cutting tool) for insulating a cavity having a lesser width, e.g. less than a standard cavity width. Preferably, the perforations of the perforated lines separably joining the tabs are filled, e.g. with the bonding agent 656 or a similar material so that the facing 654 functions as a vapor barrier and, as discussed above, while perforations are preferred, tear strings could be used with or substituted for the perforated lines used to effect the separation of the tabs.

Figure 15:
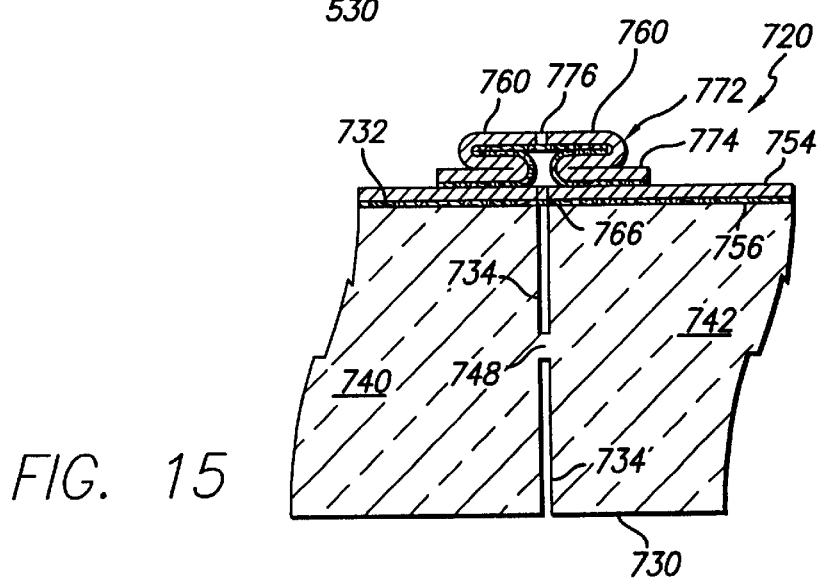
FIG. 15 is a partial schematic transverse cross section through a faced pre-cut fibrous insulation blanket of the present invention with a facing similar to that of the embodiment of FIGS. 12 and 13 except that the tabs are formed from a sheet other than the facing sheet.

The pairs of tabs aligned with or substantially aligned with the pairs of cuts and the separable connectors plus lateral tabs, such as the lateral tabs of the pre-cut fibrous insulation blanket 520 shown in FIG. 12, can be used to secure the sections of the faced pre-cut fibrous insulation blanket 620 to framing members by stapling or other conventional means either as a unit or as one or more sections when one or more sections are separated from the remainder of the pre-cut fibrous insulation blanket. As with the embodiment of FIGS. 12 and 13, when securing the faced pre-cut fibrous insulation blanket 620 or one or more sections of the faced pre-cut fibrous insulation blanket 620 to framing members, the tabs adjacent the separable connectors and the lateral tabs used to secure the blanket are at least partially unfolded and extended outward from the pre-cut fibrous insulation blanket 620 and/or sections of the pre-cut fibrous insulation blanket prior to stapling or otherwise securing the tabs to the framing members. FIG. 15 is a partial transverse cross section of a seventh embodiment 720 of the faced pre-cut fibrous insulation blanket of the present invention showing the pair of cuts 734 in the first and second major surfaces 730 and 732 of the faced pre-cut fibrous insulation blanket forming the separable connector 748 between sections 740 and 742 of the faced pre-cut fibrous insulation blanket. With one exception, the faced pre-cut fibrous insulation blanket 720 is the same as the faced pre-cut fibrous insulation blanket 520. Unlike the faced pre-cut fibrous insulation blanket 520 where the tabs adjacent the cuts in the second major surface of blanket are integral with the facing sheet, the tabs of the faced pre-cut fibrous insulation blanket 720 are formed by separate sheets of facing material bonded to the facing sheet 754.

The facing sheet 754 is bonded to the second major surface 732 of the pre-cut fibrous insulation blanket by the bonding agent 756 and is either cut or provided a perforated line 766 aligned with the cut 734 in the second major surface 732 of the pre-cut fibrous insulation blanket. A pair of Z-shaped tabs 760 are also provided adjacent and extending for the length of the cut 734 in the second major surface 732 of the pre-cut fibrous insulation blanket. The pair of tabs 760 are formed by a separate sheet 772 that is bonded to the facing sheet 754 on either side of the cut 734 by a bonding agent 774. The pair of tabs 760 are joined together along a perforated line 776 so that the tabs can be separated from each other when the sections 740 and 742 are separated from each other and, as shown in FIG. 15, each Z-shaped tab 760 is formed by twice folding the sheet 772 back upon itself into a pleat. Preferably, the sheet 772, like the facing sheet 754, is made of kraft paper, a foil-scrim-kraft paper laminate, or a polymeric film, such as but not limited to polyethylene. An identical pair of tabs is aligned with or substantially aligned with and extends for the length of each of the other pairs of cuts and separable connectors of the faced pre-cut fibrous insulation blanket 720 joining other sections of the faced pre-cut fibrous insulation blanket 720. With this structure, the faced pre-cut fibrous insulation blanket 720 with the facing 754, can be handled as a unit for insulating a cavity having a predetermined width, such as but not limited to a thirteen inch width or a standard cavity width of fourteen and one half or twenty two and one half inches, or easily separated or torn apart by hand into one or more blanket sections by separating or tearing apart the faced pre-cut fibrous insulation blanket 720 at a pair of cuts and separable connector in the blanket and at perforated lines of the facing sheet 754 joining adjacent tabs (separated without the need to use of a knife or other cutting tool) for insulating a cavity having a lesser width, e.g. less than a standard cavity width. Preferably, the perforations of the perforated lines separably joining the tabs are filled, e.g. with the bonding agent 756 or a similar material so that the facing 754 functions as a vapor barrier.

The pairs of tabs aligned with or substantially aligned with the pairs of cuts and the separable connectors plus lateral tabs, such as the lateral tabs of the pre-cut fibrous insulation blanket 520 shown in FIG. 12, can be used to secure the sections of the faced pre-cut fibrous insulation blanket 720 to framing members by stapling or other conventional means either as a unit or as one or more sections when one or more sections are separated from the remainder of the pre-cut fibrous insulation blanket. As with the embodiment of FIGS. 12 and 13, when securing the faced pre-cut fibrous insulation blanket 720 or one or more sections of the faced pre-cut fibrous insulation blanket 720 to framing members, the tabs adjacent the separable connectors and the lateral tabs used to secure the blanket are at least partially unfolded and extended outward from the pre-cut fibrous insulation blanket 720 and/or sections of the pre-cut fibrous insulation blanket prior to stapling or otherwise securing the tabs to the framing members.

FIGS. 16 and 17 show an eighth embodiment 820 of the faced pre-cut fibrous insulation blanket of the present invention. As shown, the faced pre-cut fibrous insulation blanket 820 has a first major surface 830 and a second major surface 832. There are one or more pairs of cuts, preferably two, three or more pairs of cuts (cuts 834, 836 and 838 are shown) in the first and second major surfaces 830 and 832 of the pre-cut fibrous insulation blanket which divide the pre-cut fibrous insulation blanket 820 into two or more sections, preferably three, four or more sections (four sections 840, 842, 844 and 846 are shown) extending the length of the pre-cut fibrous insulation blanket.

The cuts forming each pair of cuts 834, 836 and 838 in the faced pre-cut fibrous insulation blanket 820: extend for the length of the pre-cut fibrous insulation blanket; extend perpendicular to or substantially perpendicular to the major surfaces 830 and 832 of the faced pre-cut fibrous insulation blanket; are aligned with or substantially aligned with each other; and are spaced from each other (terminate short of contacting each other) to form separable connectors 848, 850 and 852 within the pre-cut fibrous insulation blanket 820 which join the adjacent sections 840, 842, 844 and 846 of the faced pre-cut fibrous insulation blanket together for handling, but which can be easily separated or torn apart by hand. While the separable connectors 848, 850 and 852 can be located within but close to one of the major surfaces of the faced pre-cut fibrous insulation blanket 820, preferably, the separable connectors 848, 850 and 852 are located in a midportion of the faced pre-cut fibrous insulation blanket and, more preferable, centered between the major surfaces 830 and 832 of the faced pre-cut fibrous insulation blanket. Preferably, the cuts of each pair of cuts 834, 836 and 838 extend from the first and second major surfaces 830 and 832 of the faced pre-cut fibrous insulation blanket 820 to within about one half to about one-eighth of an inch of each other and, more preferably, to within about one quarter to about three sixteenths of an inch of each other to form separable connectors which can be easily separated or torn apart by hand. The heights or thicknesses of the separable connector (s) 848, 850 and 852 can vary with the integrity of the pre-cut fibrous insulation blanket 820 with the connector(s) being greater in height or thicker for insulation blankets with less integrity.

The facing 854 of the pre-cut fibrous insulation blanket 820 is made of a plurality or series of sheets 855 which overlap successive sheets forming the facing 854. The facing or facing sheet 854, formed by the series of overlapping sheets 855, typically overlies the entire second major surface 832 of the faced pre-cut fibrous insulation blanket 820 and is bonded to the second major surface of the faced pre-cut fibrous insulation blanket 820 by a bonding agent 856. As shown in FIG. 16, the facing sheet 854 has lateral tabs 858 and pairs of tabs 860 and 861, 862 and 863, and 864 and 865, adjacent each of the cuts 834, 836 and 838 in the second major surface 832 of the faced pre-cut fibrous insulation blanket 820 for stapling or otherwise securing the faced pre-cut fibrous insulation blanket or section(s) of the faced pre-cut fibrous insulation blanket to frame members. The lateral tabs 858 extend for the length of the faced pre-cut fibrous insulation blanket 820. The pairs of tabs 860 and 861, 862 and 863, and 864 and 865 are aligned or substantially aligned longitudinally with and extend for the lengths of the pairs of cuts 834, 836 and 838 and the separable connectors 848, 850 and 852 of the faced pre-cut fibrous insulation blanket 820. Each pair of tabs 860 and 861, 862 and 863, and 864 and 865 is formed by a lateral edge portion of a preceding sheet 855 overlapping a lateral edge portion of a succeeding sheet 855 at one of the cuts 834, 836 and 838 in the second major surface of the blanket with both lateral portions of the sheets extending laterally beyond the cut in opposite directions as shown in FIGS. 16 and 17. The tabs 860 and 861, 862 and 863, and 864 and 865 of each pair of tabs are separably bonded together by the bonding agent 856 or a similar adhesive so that the facing can be separated at each of the cuts and separable connectors. With this structure, the faced pre-cut fibrous insulation blanket 820 with the facing 854, can be handled as a unit for insulating a cavity having a predetermined width, such as but not limited to a thirteen inch width or a standard cavity width of fourteen and one half or twenty two and one half inches, or easily separated or torn apart by hand into blanket sections 840, 842, 844 and/or 846 by separating or tearing apart the faced pre-cut fibrous insulation blanket 820 at the pair of cuts 834 and separable connector 848 in the blanket and the tabs 860 and 861 of the facing sheet 854, the pair of cuts 836 and separable connector 850 in the blanket and the pair of tabs 862 and 863 of the facing sheet 854, or the pair of cuts 838 and separable connector 852 in the blanket and the pair of tabs 864 and 865 of the facing sheet 854 (separated without the need to use of a knife or other cutting tool) for insulating a cavity having a lesser width, e.g. less than a standard cavity width.

Preferably, the lateral edge portions of the sheets 855 forming the facing sheet 854 are bonded together e.g. with the bonding agent 856 that bonds the facing sheet 854 to the second major surface 832 of the pre-cut fibrous insulation blanket or a similar material, so that the facing sheet 854 functions as a vapor barrier. The pairs of tabs 860 and 861, 862 and 863, and 864 and 865 adjacent the cuts 834, 836 and 838 in the second major surface of the faced pre-cut fibrous insulation blanket plus lateral tabs, such as the lateral tabs 858 shown in FIG. 16, can be used to secure the sections 840, 842, 844 and 846 of the faced pre-cut fibrous insulation blanket 820 to framing members, by stapling or other conventional means, either as a unit or as one or more sections when one or more sections 840, 842, 844 and 846 are separated from the remainder of the faced pre-cut fibrous insulation blanket. Preferably, each tab is about one half of an inch to about one and one half inches wide. When securing the faced pre-cut fibrous insulation blanket 820 or one or more sections 840, 842, 844 and 846 of the pre-cut fibrous insulation blanket to framing members, the pairs tabs 860 and 861, 862 and 863, and 864 and 865, and lateral tabs 858 used to secure the blanket are extended outward from the faced pre-cut fibrous insulation blanket 820 or sections 840, 842, 844 and/or 846 of the faced pre-cut fibrous insulation blanket prior to stapling or otherwise securing the tabs to the framing members.

FIG. 18 is a partial transverse cross section of a ninth embodiment 920 of the faced pre-cut fibrous insulation blanket of the present invention showing the pair of cuts 934 in the first and second major surfaces 930 and 932 of the faced pre-cut fibrous insulation blanket forming the separable connector 948 between sections 940 and 942 of the faced pre-cut fibrous insulation blanket. With one exception, the faced pre-cut fibrous insulation blanket 920 is the same as the faced pre-cut fibrous insulation blanket 820. Unlike the faced pre-cut fibrous insulation blanket 820 wherein the cuts of each pair of cuts forming the separable connectors are aligned or substantially aligned with each other, the cuts of the pairs of cuts forming the separable connectors of the faced pre-cut fibrous insulation blanket 920 are laterally offset with respect to each other and, preferably, overlap to form the separable connectors. As shown in FIG. 18, the cuts of the pair of cuts 934 are laterally offset with respect to each other and overlap a distance "OL" to form the separable connector 948.

The pair of tabs 960 and 961 are aligned or substantially aligned longitudinally with and extend for the lengths of the pair of cuts 934 and the separable connector 948 of the faced pre-cut fibrous insulation blanket 920. The pair of tabs 960 and 961 is formed by a lateral edge portion of a preceding sheet 955 overlapping a lateral edge portion of a succeeding sheet 955 at the cut 934 in the second major surface of the blanket with both lateral portions of the sheets extending laterally beyond the cut in opposite directions as shown in FIG. 18. The tabs 960 and 961 are separably bonded together by the bonding agent 956 or a similar adhesive so that the facing can be separated at each of the cuts and separable connectors. Identical pairs of tabs are provided adjacent and extending for the length of any additional cuts in the second major surface of the faced pre-cut fibrous insulation blanket forming separable connectors joining other sections of the faced pre-cut fibrous insulation blanket 920. With this structure, the faced pre-cut fibrous insulation blanket 920 with the facing 954, can be handled as a unit for insulating a cavity having a predetermined width, such as but not limited to a thirteen inch width or a standard cavity width of fourteen and one half or twenty two and one half inches, or easily separated or torn apart by hand into one or more blanket sections by separating or tearing apart the faced pre-cut fibrous insulation blanket 920 at a pair of cuts and separable connector in the blanket, at a pair of tabs of the facing sheet 954 (separated without the need to use of a knife or other cutting tool) for insulating a cavity having a lesser width, e.g. less than a standard cavity width.

The tabs adjacent the cuts in the second major surface of the pairs of cuts forming the separable connectors plus lateral tabs, such as the tabs of the faced pre-cut fibrous insulation blanket shown in FIG. 16, can be used to secure the sections of the faced pre-cut fibrous insulation blanket 920 to framing members by stapling or other conventional means either as a unit or as one or more sections when one or more sections are separated from the remainder of the pre-cut fibrous insulation blanket. As with the embodiment of FIGS. 16 and 17, when securing the faced pre-cut fibrous insulation blanket 920 or one or more sections of the faced pre-cut fibrous insulation blanket to framing members, the tabs adjacent the separable connectors and the lateral tabs used to secure the blanket are extended outward from the faced pre-cut fibrous insulation blanket 920 and/or sections of the faced pre-cut fibrous insulation blanket prior to stapling or otherwise securing the tabs to the framing members.

As an example of the versatility of the faced and unfaced pre-cut fibrous insulation blankets 20 to 920, the preferred different widths of the sections, when three sections are formed in a fifteen inch wide embodiment of the invention, enable the pre-cut fibrous insulation blankets 20 to 920 to be quickly and easily formed into widths of about three and one-half inches (e.g. section 38), five inches (e.g. section 40), six and one-half inches (e.g. section 42), eight and one-half inches ( e.g. sections 38 and 40) and eleven and one-half inches (e.g. sections 40 and 42). Where the pre-cut fibrous insulation blanket is separated into four sections, the installer has even more options. Thus, the pre-cut fibrous insulation blankets 20 to 920 can not only be used to insulate cavities having standard widths, but the width of the pre-cut fibrous insulation blanket can also be quickly and easily modified to fit cavities of various non-standard widths. The use of a resilient fibrous insulation blanket 20 to 920, such as a resilient glass fiber insulation blanket, further enhances the ability of the pre-cut fibrous insulation blanket to conform to various cavity widths.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A pre-cut fibrous insulation blanket for custom fitting the insulation blanket into cavities of different widths formed by building framework, comprising:

an elongated fibrous insulation blanket; the fibrous insulation blanket having a length, a width and a thickness; the fibrous insulation blanket having a first major surface and a second major surface; the fibrous insulation blanket having a first cut in the first major surface of the fibrous insulation blanket extending for the length of the fibrous insulation blanket and spaced inwardly from both lateral edges of the fibrous insulation blanket; the fibrous insulation blanket having a second cut in the second major surface of the fibrous insulation blanket extending for the length of the fibrous insulation blanket and spaced inwardly from both lateral edges of the fibrous insulation blanket; the first cut and the second cut being spaced from each other a distance sufficient to form a first separable connector between the first and second cuts which joins adjacent sections of the fibrous insulation blanket; the first separable connector holding together the adjacent sections of the fibrous insulation blanket joined by the first separable connector for handling and being separable by hand whereby the fibrous insulation blanket can be handled as a unit for insulating a cavity having a width about equal to the width of the fibrous insulation blanket or easily separated by hand into sections at the separable connector formed between the first and second cuts for insulating a cavity having a lesser width.

2. The pre-cut fibrous insulation blanket according to claim 1, wherein:

the first cut and the second cut extend to within about one half to about one eighth of an inch of each other.

3. The pre-cut fibrous insulation blanket according to claim 1, wherein:

the first cut and the second cut are aligned with each other.

4. The pre-cut fibrous insulation blanket according to claim 3, wherein:

the first cut and the second cut extend to within about one half to about one eighth of an inch of each other.

5. The pre-cut fibrous insulation blanket according to claim 3, wherein:

the first separable connector between the first cut and the second cut is located about midway between the first and second major surfaces.

6. The pre-cut fibrous insulation blanket according to claim 1, wherein:

the first cut and the second cut are offset laterally with respect to each other.

7. The pre-cut fibrous insulation blanket according to claim 6, wherein:

the first cut and the second cut extend to within about one half to about one eighth of an inch of each other.

8. The pre-cut fibrous insulation blanket according to claim 6, wherein:
the first cut and the second cut overlap each other.

9. The pre-cut fibrous insulation blanket according to claim 6, wherein:
the first separable connector between the first cut and the second cut is located about midway between the first and second major surfaces.

10. The pre-cut fibrous insulation blanket according to claim 1, wherein:
the width of the fibrous insulation blanket is about thirteen to about thirteen and one half inches.

11. The pre-cut fibrous insulation blanket according to claim 1, wherein:
the width of the fibrous insulation blanket is about fourteen and one half to about fifteen inches.

12. The pre-cut fibrous insulation blanket according to claim 1, wherein:
the width of the fibrous insulation blanket is about twenty two and one half to about twenty three inches.

13. The pre-cut fibrous insulation blanket according to claim 1, wherein:
the fibrous insulation blanket is a resilient glass fiber insulation blanket having a density between about 0.4 pounds/ft$^3$ and about 1.5 pounds/ft$^3$.

14. The pre-cut fibrous insulation blanket according to claim 1, wherein:
a facing sheet overlies the first major surface of the fibrous insulation blanket and is bonded to the first major surface of the fibrous insulation blanket; and the facing sheet has a first separable means therein extending for the length of the fibrous insulation blanket which permits the facing sheet to be separated by hand along the first cut in the fibrous insulation blanket whereby the fibrous insulation blanket with the facing can be handled as a unit for insulating a cavity having a width about equal to the width of the fibrous insulation blanket or easily separated into sections by hand at the first separable connector of the fibrous insulation blanket and the first separable means of the facing for insulating a cavity having a lesser width.

15. The pre-cut fibrous insulation blanket according to claim 14, wherein:
the facing sheet is made of a material selected from the group consisting of kraft paper, polymeric film, and foil-scrim-kraft paper laminate; and
the fibrous insulation blanket is a resilient glass fiber insulation blanket having a density between about 0.4 pounds/ft$^3$ and about 1.5 pounds/ft$^3$.

16. The pre-cut fibrous insulation blanket according to claim 14, wherein:
the first separable means of the facing sheet is a first perforated line.

17. The pre-cut fibrous insulation blanket according to claim 16, wherein:
the perforations of the first perforated line in the facing sheet are filled with a bonding agent that bonds the facing sheet to the first major surface of the fibrous insulation blanket to close the perforations so that the facing sheet functions as a vapor barrier.

18. The pre-cut fibrous insulation blanket according to claim 16, wherein:
the facing sheet has a first pair of tabs, adjacent lateral edges of the first major surface of the fibrous insulation blanket, which extend along the length of the insulation blanket, for securing the fibrous insulation blanket to framing members; and
the facing sheet has a second pair of tabs, adjacent the first cut and extending along the length of the fibrous insulation blanket, for securing the sections of the fibrous insulation blanket adjacent the cut to framing members; and each tab of the second pair of tabs is joined to the other of the second pair of tabs by the first perforated line.

19. The pre-cut fibrous insulation blanket according to claim 18, wherein:
the second pair of tabs comprises a portion of the facing sheet double folded upon itself to form a Z-shaped pleat.

20. The pre-cut fibrous insulation blanket according to claim 18, wherein:
each of the second pair of tabs comprises a portion of the facing sheet double folded upon itself to form a Z-shaped pleat.

21. The pre-cut fibrous insulation blanket according to claim 18, wherein:
the second pair of tabs is formed by a second sheet bonded to the facing sheet along both sides of the first cut and each of the second pair of tabs comprises a portion of the second sheet double folded upon itself to form a Z-shaped pleat.

22. The pre-cut fibrous insulation blanket according to claim 18, wherein:
each of the second pair of tabs comprises a portion of the facing sheet which is tucked into the first cut.

23. The pre-cut fibrous insulation blanket according to claim 14, wherein:
the facing sheet comprises a series of sheets with overlapping lateral edge portions that are separably bonded together; and the first separable means of the facing sheet is formed by the overlapping, separably bonded, lateral edge portions of successive sheets of the series of sheets.

24. The pre-cut fibrous insulation blanket according to claim 14, wherein:
the first cut and the second cut are aligned with each other.

25. The pre-cut fibrous insulation blanket according to claim 24, wherein:
the first separable connector between the first cut and the second cut is located about midway between the first and second major surfaces.

26. The pre-cut fibrous insulation blanket according to claim 14, wherein:
the first cut and the second cut are offset laterally with respect to each other.

27. The pre-cut fibrous insulation blanket according to claim 26, wherein:
the first cut and the second cut overlap each other.

28. The pre-cut fibrous insulation blanket according to claim 27, wherein:
the first separable connector between the first cut and the second cut is located about midway between the first and second major surfaces.

29. The pre-cut fibrous insulation blanket according to claim 14, wherein:
the width of the fibrous insulation blanket is about thirteen to about thirteen and one half inches; the length of the fibrous insulation blanket is at least forty six inches; and the thickness of the fibrous insulation blanket is at least three inches.

30. The pre-cut fibrous insulation blanket according to claim 14, wherein:
the width of the fibrous insulation blanket is about fourteen and one half to about fifteen inches; the length of the fibrous insulation blanket is at least forty six inches; and the thickness of the fibrous insulation blanket is at least three inches.

31. The pre-cut fibrous insulation blanket according to claim 14, wherein:
the width of the fibrous insulation blanket is about twenty two and one half to about twenty three inches; the length of the fibrous insulation blanket is at least forty six inches; and the thickness of the fibrous insulation blanket is at least three inches.

32. The pre-cut fibrous insulation blanket according to claim 1, wherein:
the fibrous insulation blanket has a third cut in the first major surface of the fibrous insulation blanket extending for the length of the fibrous insulation blanket, spaced laterally from the first and second cuts, and spaced inwardly from the both lateral edges of the fibrous insulation blanket; the fibrous insulation blanket has a fourth cut in the second major surface of the fibrous insulation blanket extending for the length of the fibrous insulation blanket, spaced laterally from the first and second cuts, and spaced inwardly from the both lateral edges of the fibrous insulation blanket; the third cut and the fourth cut being spaced from each other a distance sufficient to form a second separable connector between the third and fourth cuts which joins adjacent sections of the fibrous insulation blanket; the second separable connector holding together the adjacent sections of the fibrous insulation blanket joined by the second separable connector for handling and being separable by hand whereby the fibrous insulation blanket can be handled as a unit for insulating a cavity having a width about equal to the width of the fibrous insulation blanket or easily separated into sections by hand at the first separable connector formed between the first and second cuts and the second separable connector formed between the third and fourth cuts for insulating a cavity having a lesser width.

33. The pre-cut fibrous insulation blanket according to claim 32, wherein:
the first cut and the second cut extend to within about one half to about one eighth of an inch of each other and the third cut and the fourth cut extend to within about one half to about one eighth of an inch of each other.

34. The pre-cut fibrous insulation blanket according to claim 32, wherein:
the first cut and the second cut are aligned with each other and the third cut and the fourth cut are aligned with each other.

35. The pre-cut fibrous insulation blanket according to claim 34, wherein:
the first cut and the second cut extend to within about one half to about one eighth of an inch of each other and the third cut and the fourth cut extend to within about one half to about one eighth of an inch of each other.

36. The pre-cut fibrous insulation blanket according to claim 34, wherein:
the first separable connector between the first cut and the second cut and the second separable connector between the third and the fourth cut are located about midway between the first and second major surfaces.

37. The pre-cut fibrous insulation blanket according to claim 32, wherein:
the first cut and the second cut are offset laterally with respect to each other and the third cut and the fourth cut are offset laterally with respect to each other.

38. The pre-cut fibrous insulation blanket according to claim 37, wherein:
the first cut and the second cut extend to within about one half to about one eighth of an inch of each other and the third cut and the fourth cut extend to within about one half to about one eighth of an inch of each other.

39. The pre-cut fibrous insulation blanket according to claim 37, wherein:
the first cut and the second cut overlap each other and the third cut and the fourth cut overlap each other.

40. The pre-cut fibrous insulation blanket according to claim 37, wherein:
the first separable connector between the first cut and the second cut and the second separable connector between the third and the fourth cut are located about midway between the first and second major surfaces.

41. The pre-cut fibrous insulation blanket according to claim 32, wherein:
the width of the fibrous insulation blanket is about thirteen to about thirteen and one half inches.

42. The pre-cut fibrous insulation blanket according to claim 32, wherein:
the width of the fibrous insulation blanket is about fourteen and one half to about fifteen inches.

43. The pre-cut fibrous insulation blanket according to claim 32, wherein:
the width of the fibrous insulation blanket is about twenty two and one half to about twenty three inches.

44. The pre-cut fibrous insulation blanket according to claim 32, wherein:
the fibrous insulation blanket is a resilient glass fiber insulation blanket having a density between about 0.4 pounds/ft$^3$ and about 1.5 pounds/ft$^3$.

45. The pre-cut fibrous insulation blanket according to claim 32, wherein:
a facing sheet overlies the first major surface of the fibrous insulation blanket and is bonded to the first major surface of the fibrous insulation blanket; and the facing sheet has first and second separable means therein extending for the length of the fibrous insulation blanket for permitting the facing sheet to be separated by hand along the first and third cuts in the fibrous insulation blanket whereby the fibrous insulation blanket with the facing can be handled as a unit for insulating a cavity having a width about equal to the width of the fibrous insulation blanket or easily separated into sections by hand at the first separable connector of the fibrous insulation blanket and the first separable means of the facing sheet and second separable connector of the fibrous insulation blanket and the second separable means of the facing sheet for insulating a cavity having a lesser width.

46. The pre-cut fibrous insulation blanket according to claim 45, wherein:
the facing sheet is made of a material selected from the group consisting of kraft paper, polymeric film, and foil-scrim-kraft paper laminate; and
the fibrous insulation blanket is a resilient glass fiber insulation blanket having a density between about 0.4 pounds/ft$^3$ and about 1.5 pounds/ft$^3$.

47. The pre-cut fibrous insulation blanket according to claim 45, wherein:

the first and second separable means of the facing sheet are first and second perforated lines.

48. The pre-cut fibrous insulation blanket according to claim 47, wherein:

the perforations of the first and second perforated lines are filled with a bonding agent that bonds the facing sheet to the first major surface of the fibrous insulation blanket to close the perforations so that the facing sheet functions as a vapor barrier.

49. The pre-cut fibrous insulation blanket according to claim 47, wherein:

the facing sheet has a first pair of tabs, adjacent lateral edges of the first major surface of the fibrous insulation blanket which extend along the length of the insulation blanket for securing the fibrous insulation blanket to framing members;

the facing sheet has a second pair of tabs, adjacent the first cut and extending along the length of the fibrous insulation blanket for securing the sections of fibrous insulation blanket adjacent the first cut to framing members; and each tab of the second pair of tabs is joined to the other of the second pair of tabs by the first perforated line; and the facing sheet has a third pair of tabs, adjacent the third cut and extending along the length of the fibrous insulation blanket for securing the sections of the fibrous insulation blanket adjacent the third cut to framing members; and each tab of the third pair of tabs is joined to the other of the third pair of tabs by the second perforated line.

50. The pre-cut fibrous insulation blanket according to claim 49, wherein:

the second pair of tabs and the third pair of tabs each comprise a portion of the facing sheet double folded upon itself to form a Z-shaped pleat.

51. The pre-cut fibrous insulation blanket according to claim 49, wherein:

each of the second pair of tabs and each of the third pair of tabs comprises a portion of the facing sheet double folded upon itself to form a Z-shaped pleat.

52. The pre-cut fibrous insulation blanket according to claim 49, wherein:

the second pair of tabs is formed by a second sheet bonded to the facing sheet along both sides of the first cut and each of the second pair of tabs comprises a portion of the second sheet double folded upon itself to form a Z-shaped pleat; and the third pair of tabs is formed by a third sheet bonded to the facing sheet along both sides of the third cut and each of the third pair of tabs comprises a portion of the third sheet double folded upon itself to form a Z-shaped pleat.

53. The pre-cut fibrous insulation blanket according to claim 49, wherein:

each of the second pair of tabs comprises a portion of the facing sheet which is tucked into the first cut; and each of the third pair of tabs comprises a portion of the facing sheet which is tucked into the third cut.

54. The pre-cut fibrous insulation blanket according to claim 45, wherein:

the facing sheet comprises a series of sheets with overlapping lateral edge portions that are separably bonded together; and the first and second separable means of the facing sheet are each formed by the overlapping, separably bonded, lateral edge portions of successive sheets of the series of sheets.

55. The pre-cut fibrous insulation blanket according to claim 45, wherein:

the first cut and the second cut are aligned with each other and the third cut and the fourth cut are aligned with each other.

56. The pre-cut fibrous insulation blanket according to claim 55, wherein:

the first separable connector between the first cut and the second cut and the second separable connector between the third cut and the fourth cut are located about midway between the first and second major surfaces.

57. The pre-cut fibrous insulation blanket according to claim 45, wherein:

the first cut and the second cut are offset laterally with respect to each other and the third cut and the fourth cut are offset laterally with respect to each other.

58. The pre-cut fibrous insulation blanket according to claim 57, wherein:

the first cut and the second cut overlap each other and the third and the fourth cut overlap each other.

59. The pre-cut fibrous insulation blanket according to claim 58, wherein:

the first separable connector between the first cut and the second cut and the second separable connector between the third cut and the fourth cut are located about midway between the first and second major surfaces.

60. The pre-cut fibrous insulation blanket according to claim 45, wherein:

the width of the fibrous insulation blanket is about thirteen to about thirteen and one half inches; the length of the fibrous insulation blanket is at least forty six inches; and the thickness of the fibrous insulation blanket is at least three inches.

61. The pre-cut fibrous insulation blanket according to claim 45, wherein:

the width of the fibrous insulation blanket is about fourteen and one half to about fifteen inches; the length of the fibrous insulation blanket is at least forty six inches; and the thickness of the fibrous insulation blanket is at least three inches.

62. The pre-cut fibrous insulation blanket according to claim 45, wherein:

the width of the fibrous insulation blanket is about twenty two and one half to about twenty three inches; the length of the fibrous insulation blanket is at least forty six inches; and the thickness of the fibrous insulation blanket is at least three inches.

* * * * *